(12) United States Patent
Sakata et al.

(10) Patent No.: US 10,845,201 B2
(45) Date of Patent: Nov. 24, 2020

(54) VEHICLE CONTROL APPARATUS AND VEHICLE CONTROL METHOD

(71) Applicant: Panasonic Intellectual Property Corporation of America, Torrance, CA (US)

(72) Inventors: Kotaro Sakata, Osaka (JP); Kimio Minami, Nara (JP); Tetsuji Fuchikami, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 307 days.

(21) Appl. No.: 15/866,038

(22) Filed: Jan. 9, 2018

(65) Prior Publication Data

US 2018/0216947 A1    Aug. 2, 2018

(30) Foreign Application Priority Data

Jan. 27, 2017 (JP) ................................. 2017-013535
Oct. 5, 2017 (JP) ................................. 2017-194894

(51) Int. Cl.
| | | |
|---|---|---|
| *G01M 17/00* | (2006.01) | |
| *G01C 21/34* | (2006.01) | |
| *G05D 1/00* | (2006.01) | |
| *G08G 1/00* | (2006.01) | |
| *G06Q 10/04* | (2012.01) | |
| *G08G 1/127* | (2006.01) | |

(Continued)

(52) U.S. Cl.
CPC ..... *G01C 21/3407* (2013.01); *G01C 21/3685* (2013.01); *G05D 1/0088* (2013.01); *G06Q 10/047* (2013.01); *G08G 1/127* (2013.01); *G08G 1/148* (2013.01); *G08G 1/20* (2013.01); *G08G 1/202* (2013.01)

(58) Field of Classification Search
None
See application file for complete search history.

(56) References Cited

U.S. PATENT DOCUMENTS

| | | |
|---|---|---|
| 2015/0199619 A1 | 7/2015 | Ichinose et al. |
| 2016/0205238 A1* | 7/2016 | Abramson ......... G01C 21/3641 455/456.4 |

(Continued)

FOREIGN PATENT DOCUMENTS

| | | |
|---|---|---|
| JP | 2009-301150 A | 12/2009 |
| JP | 2016-085509 A | 5/2016 |

(Continued)

OTHER PUBLICATIONS

The Extended European Search Report dated Jul. 9, 2018 for the related European Patent Application No. 18153199.7.

*Primary Examiner* — Adam M Alharbi

(74) *Attorney, Agent, or Firm* — Greenblum & Bernstein, P.L.C.

(57) ABSTRACT

When a vehicle that can travel autonomously is dropped off, a vehicle control apparatus causes the vehicle to move to a standby place by traveling autonomously. Specifically, when the vehicle is dropped off, the vehicle control apparatus determines a moving destination among standby places, based on the current location of the vehicle, and the locations of the standby places, and vehicle-demand prediction information, and instructs the vehicle to move to the determined moving destination.

12 Claims, 23 Drawing Sheets

(51) Int. Cl.
  *G01C 21/36* (2006.01)
  *G08G 1/14* (2006.01)

(56) References Cited

U.S. PATENT DOCUMENTS

2016/0343068 A1    11/2016  Barrois et al.
2017/0123423 A1     5/2017  Sako et al.
2017/0210394 A1 *   7/2017  Yamada ................ B60W 50/14

FOREIGN PATENT DOCUMENTS

JP    2016-148910 A    8/2016
WO    2015/166811     11/2015

* cited by examiner

| STANDBY-PLACE INFORMATION | | |
|---|---|---|
| STANDBY-PLACE ID | LOCATION (x, y) | STATE |
| 001 | (489, 1034) | VACANT |
| 002 | (513, 929) | IN USE |
| 003 | (559, 813) | VACANT |
| ... | ... | ... |

○ SPOT WHERE APPEARANCE FREQUENCY OF USERS OF VEHICLES IS HIGH

FIG. 22

| STANDBY-PLACE INFORMATION | | | |
|---|---|---|---|
| STANDBY-PLACE ID | LOCATION (x, y) | MAXIMUM NUMBER OF BICYCLES ON STANDBY | NUMBER OF BICYCLES ON STANDBY |
| 001 | (489, 1034) | 10 | 8 |
| 002 | (513, 929) | 20 | 17 |
| 003 | (559, 813) | 15 | 6 |
| ... | ... | ... | ... |

FIG. 23

| VEHICLE INFORMATION | | | |
|---|---|---|---|
| VEHICLE ID | LOCATION (x, y) | STATE | MOVING DESTINATION |
| 001 | (489, 1034) | AVAILABLE | – |
| 002 | (616, 817) | IN USE | (981, 784) |
| 003 | (555, 394) | IN USE | – |
| 004 | (825, 116) | AVAILABLE | – |
| ... | ... | ... | ... |

VEHICLE CONTROL APPARATUS AND VEHICLE CONTROL METHOD

BACKGROUND

1. Technical Field

The present disclosure relates to a vehicle control apparatus and a vehicle control method for causing, when a vehicle that is capable of traveling autonomously is dropped off, the vehicle to move a standby place in an unmanned manner.

2. Description of the Related Art

International Publication No. 2015/166811 (hereinafter referred to as "Patent Document 1") discloses a system using a self-driving vehicle (such as an electric car) that can travel autonomously. The self-driving vehicle disclosed in Patent Document 1 receives settings for an operation after a user gets out of the self-driving vehicle. Patent Document 1 also discloses that when the operation after the user gets out of the self-driving vehicle is set to "return", the self-driving vehicle returns to a predetermined return place, such as a parking lot of a nearest car rental company, after the self-driving vehicle is dropped off.

SUMMARY

In such a system, it is desired that a dropped off vehicle be allocated to an appropriate location.

One non-limiting and exemplary embodiment provides a vehicle control apparatus or a vehicle control method that can allocate a dropped off vehicle to an appropriate location.

In one general aspect, the techniques disclosed here feature an apparatus including: a processor and a memory storing thereon a computer program, which when executed by the processor, causes the processor to perform operations including: determining, when a vehicle that is capable of traveling autonomously is dropped off, a moving destination among a plurality of standby places, based on a current location of the vehicle which is indicated by a global positioning system provided in the vehicle, locations of the standby places, and vehicle-demand prediction information; and instructing the vehicle to move to the determined moving destination.

The present disclosure can provide a vehicle control apparatus or a vehicle control method that can allocate a dropped off vehicle to an appropriate location.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 7 is a table illustrating one example of standby-place information according to the first embodiment;

FIG. 22 is a table illustrating one example of standby-place information according to the second embodiment;

FIG. 23 is a table illustrating one example of vehicle information according to the second embodiment;

DETAILED DESCRIPTION

Figure 1:
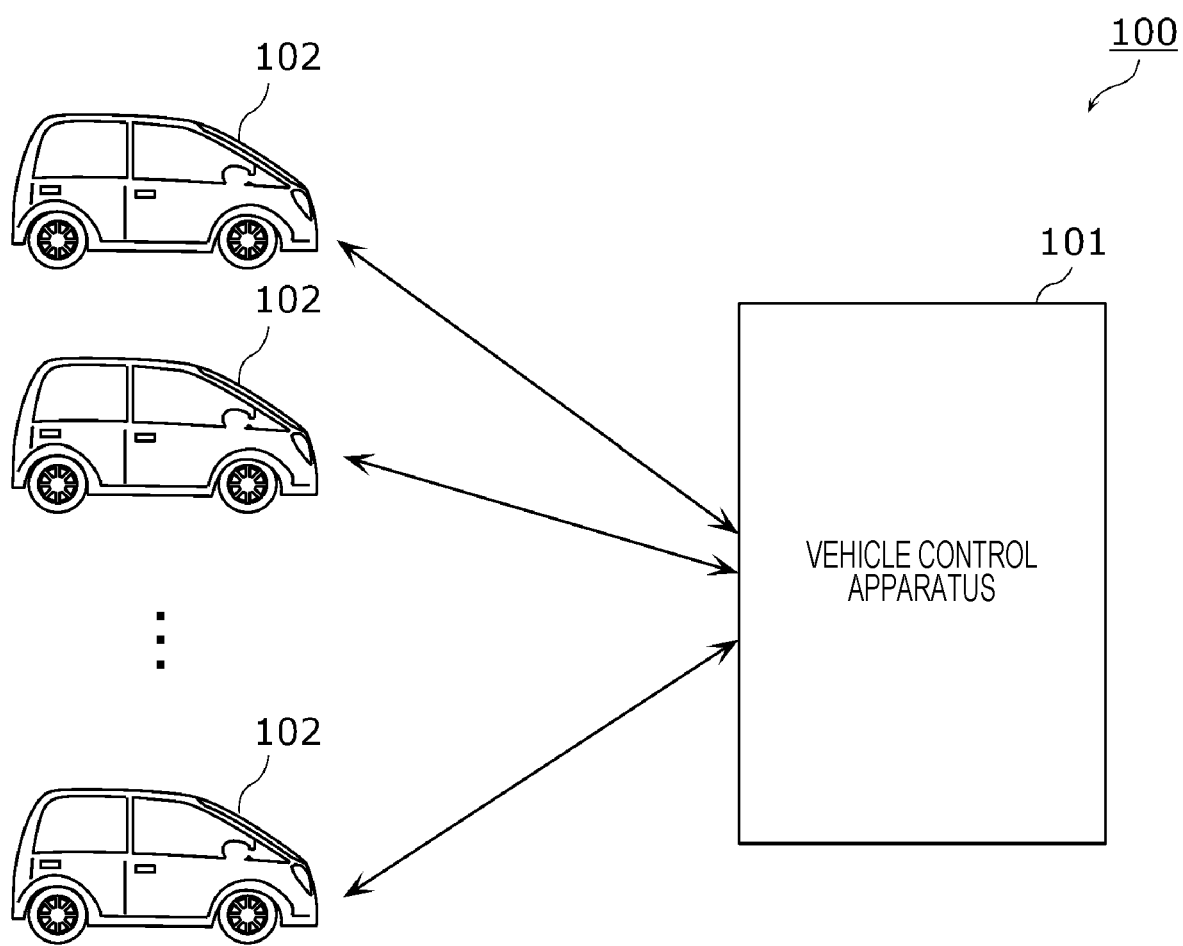
FIG. 1 is a diagram illustrating the configuration of a vehicle control system according to a first embodiment.

A vehicle control apparatus according to one aspect of the present disclosure is directed to a vehicle control apparatus that causes, when a vehicle that is capable of traveling autonomously is dropped off, the vehicle to move to a standby place by traveling autonomously. The apparatus includes: a moving-destination determiner that determines, when the vehicle is dropped off, a moving destination among a plurality of standby places, based on a current location of the vehicle, locations of the standby places, and vehicle-demand prediction information; and a moving instructor that instructs the vehicle to move to the determined moving destination.

According to this configuration, the vehicle control apparatus can allocate a dropped off vehicle to an appropriate location by using the vehicle-demand prediction information. Also, since the appropriate location can be determined in such a manner, re-moving the vehicle or the like can be suppressed or reduced, and thus the amount of fuel consumed by the vehicle can be reduced. In addition, since re-performing a computational operation, re-issuing an instruction, and so on can be suppressed, it is possible to reduce throughput of the vehicle control apparatus.

For example, the moving-destination determiner may determine, among the standby places, moving-destination candidates included in a predetermined range from the current location and may determine the moving destination among the moving-destination candidates, based on the demand prediction information.

For example, the vehicle may be an electrically powered vehicle; battery chargers for the vehicle is provided at the standby places; and when the vehicle is dropped off, the moving-destination determiner may determine the moving destination, based on the current location, the locations of the standby places, the demand prediction information, and a current battery charge of the vehicle.

According to this configuration, the vehicle control apparatus can allocate a dropped off vehicle to an appropriate location, based on the battery charge of the vehicle.

For example, the moving-destination determiner may determine, among the standby places, the moving-destination candidates included in a range that the vehicle is capable of traveling from the current location by using the current battery charge and may determine the moving destination among the moving-destination candidates, based on the demand prediction information.

For example, when the vehicle is dropped off, the moving-destination determiner may determine, the moving destination, based on the current location, the locations of the standby places, the demand prediction information, and information about a plurality of vehicles.

According to this configuration, the vehicle control apparatus can allocate a dropped off vehicle to an appropriate location by using the information about a plurality of vehicles.

For example, the vehicle control apparatus may further include a demand predictor that determines the demand prediction information, based on population information.

According to this configuration, the vehicle control apparatus can generate appropriate demand prediction information.

For example, the vehicle control apparatus may further include a demand predictor that determines dynamic demand prediction information, based on dynamic power consumption data.

According to this configuration, this vehicle control apparatus can generate dynamic demand prediction information based on power consumption data.

For example, the vehicle control apparatus may further include a demand predictor that that determines the dynamic demand prediction information, based on dynamic sales data of stores.

According to this configuration, the vehicle control apparatus can generate dynamic demand prediction information based on sales data.

For example, the vehicle control apparatus may further include a demand predictor that determines the dynamic demand prediction information, based on weather forecast information.

According to this configuration, the vehicle control apparatus can generate dynamic demand prediction information based on weather forecast information.

For example, the vehicle control apparatus may further include a drop-off determiner that determines whether or not the vehicle is dropped off, based on a state of the vehicle.

For example, the state of the vehicle may include at least one of a speed of the vehicle, a change in weight applied to the vehicle, opening and closing of a door, and locking of a door.

According to this configuration, the vehicle control apparatus can appropriately determine drop-off of a vehicle.

A vehicle control method according to one aspect of the present disclosure is directed to a vehicle control method that causes, when a vehicle that is capable of traveling autonomously is dropped off, the vehicle to move to a standby place by traveling autonomously. The method includes: determining, when a vehicle that is capable of traveling autonomously is dropped off, a moving destination among a plurality of standby places, based on a current location of the vehicle which is indicated by a global positioning system provided in the vehicle, locations of the standby places, and vehicle-demand prediction information; and instructing the vehicle to move to the determined moving destination.

According to the vehicle control method, it is possible to allocate a dropped off vehicle to an appropriate location by using the vehicle-demand prediction information.

The configuration for allocating a vehicle to an appropriate location by using the vehicle-demand prediction information can also be applied to a bicycle sharing system.

The bicycle sharing system includes: an incentive determiner that determines an incentive to be given to a user when the user moves a bicycle to a moving destination that is one of standby places, based on the number of bicycles on standby at each of the standby places and bicycle-demand prediction information, and an informer that informs the user of the moving destination and the incentive.

According to this configuration, by using the vehicle (i.e., bicycle) demand prediction information, the bicycle sharing system can guide users so that vehicles are allocated to appropriate locations. Since the appropriate locations can be determined in such a manner, it is possible to suppress re-performing a computational operation, re-issuing an instruction, and so on, thus making it possible to reduce throughput of a control apparatus.

The incentive determiner may increase the incentive, as the distance from the current location of the bicycle to the moving destination increases.

According to this configuration, the bicycle sharing system can determine an appropriate incentive.

The incentive determiner may increase the incentive, as the number of bicycles that are present at the moving destination gets smaller relative to demand prediction for the moving destination, the demand prediction being indicated by the demand prediction information.

According to this configuration, the bicycle sharing system can guide users so that the vehicles are allocated to more appropriate locations.

A bicycle sharing system may include: determining an incentive to be given to a user when the user moves a bicycle to a moving destination that is one of standby places, based on the number of bicycles on standby at each of the standby places and bicycle-demand prediction information, and informing the user of the moving destination and the incentive.

According to the bicycle sharing method, by using the vehicle (i.e., bicycle) demand prediction information, it is possible to guide users so that the vehicles are allocated to appropriate locations.

It should be noted that general or specific embodiments may be implemented as a system, a method, an integrated circuit, a computer program, a computer-readable storage medium such as compact disc read-only memory (CD-ROM), or any selective combination thereof.

Embodiments will be described below in detail with reference to the accompanying drawings. The embodiments described below each represent a general or specific example. Numerical values, shapes, materials, constituent elements, the arrangement positions and connections of constituent elements, steps, the order of steps, and so on described in the embodiments below are examples and are not intended to limit the present disclosure. Of the constituent elements in the embodiments described below, the constituent elements not set forth in the independent claims that represent the broadest concept will be described as optional constituent elements.

First Embodiment

First, a description will be given of the configuration of a vehicle control system according to a first embodiment. FIG. 1 is a diagram illustrating the configuration of a vehicle control system 100 according to the first embodiment. As illustrated in FIG. 1, the vehicle control system 100 includes a plurality of vehicles 102 and a vehicle control apparatus 101 that controls the vehicles 102.

Each of the vehicles 102 is, for example, an electrically powered vehicle, such as an electric vehicle, having an autonomous driving function and can travel autonomously (e.g., in an unmanned manner).

Figure 2:
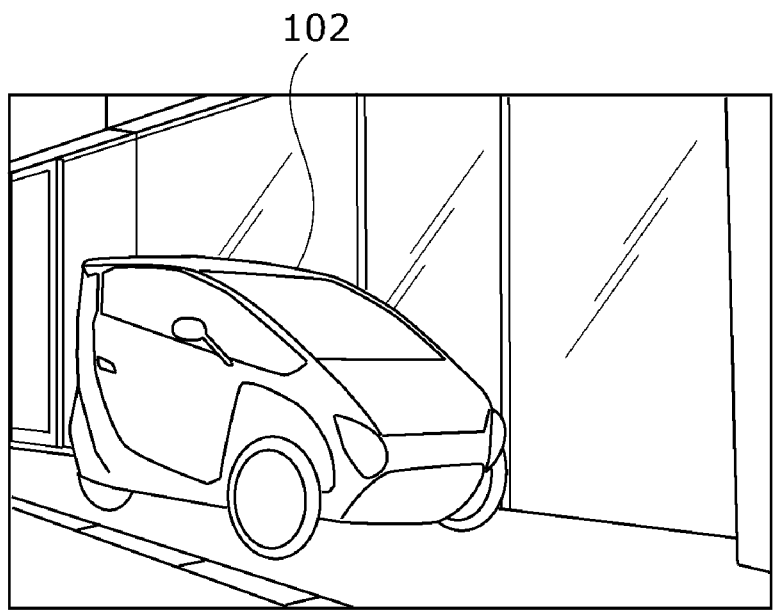
FIG. 2 is a view illustrating one example of a vehicle according to the first embodiment and a standby place.

For example, as illustrated in FIG. 2, each vehicle 102 can be parked or charged in small space in a town. Thus, users can use the vehicles 102 parked at various standby places in the town. For example, each user rides one of the vehicles 102 that are parked and sets a destination. Thus, the vehicle 102 travels autonomously to the set destination while the user is in the vehicle 102. The user may pre-set the destination via a portable terminal or the like, before he or she gets in the vehicle 102. When the user gets out of the vehicle 102 at the destination, the vehicle 102 travels autonomously to one of the standby places, stands by, and performs charging. A user getting out of the vehicle 102 at a destination is herein referred to as "drop off".

When a user is in the vehicle 102, the vehicle 102 may be driven by the user, rather than traveling autonomously.

Also, instead of a user visiting one of the standby places, the vehicle 102 may move to a pickup place designated by the user by traveling autonomously, on the basis of the user's instruction given or reservation made via a portable terminal or the like. In this case, the vehicle 102 may move, by traveling autonomously, the vehicle 102 closest to a pickup place designated by the user to the pickup place by. Also, the vehicle 102 that moves to the pickup place may be determined based on a destination set by the user, rather than moving the vehicle 102 closest to the pickup place designated by the user. For example, when the vehicle 102 that is being sent toward a place in the vicinity of a destination set by the user is moved to a pickup place by traveling autonomously, it is possible to realize efficient vehicle dispatch.

Each of the standby places is not limited to a private parking space like that illustrated in FIG. 2 and may be a parking space where a business operator runs a parking-lot business, a public parking space, or the like. In this case, battery chargers for the vehicles 102 are provided at the standby places. For example, each vehicle 102 is automatically charged by a method in which a charging connector is physically connected thereto or by a method using contactless charging. Work for the charging may be partly or entirely performed by personnel who are present at each standby place.

The vehicle control apparatus 101 can communicate with the vehicles 102 through a communication network or the like. When one of the vehicles 102 is dropped off, the vehicle control apparatus 101 causes the vehicle 102 to move to a standby place by traveling autonomously (e.g., in an unmanned manner).

Figure 3:
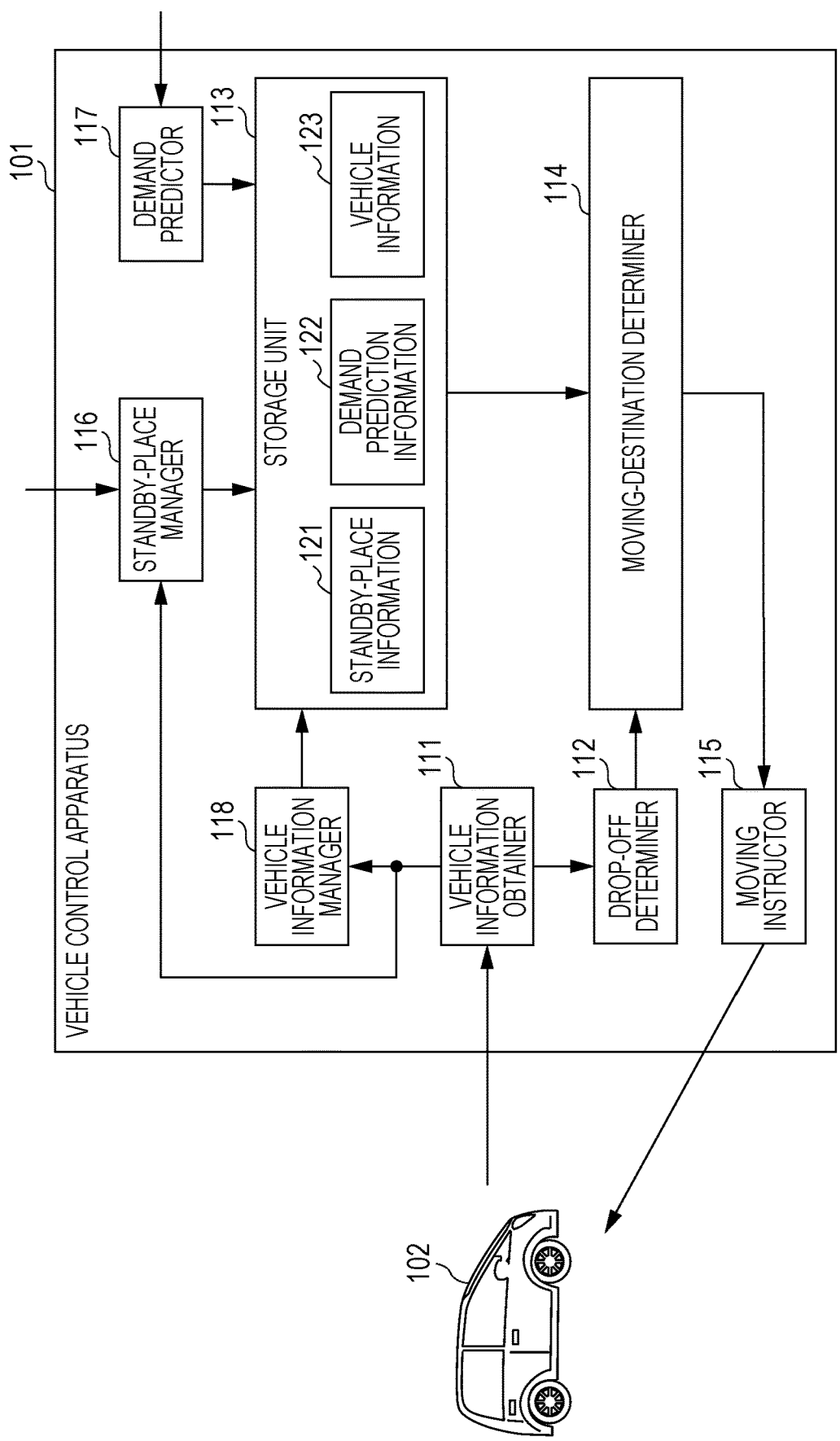
FIG. 3 is a block diagram illustrating the configuration of a vehicle control apparatus according to the first embodiment.

Next, a description will be given of the configuration of the vehicle control apparatus 101. FIG. 3 is a block diagram illustrating the configuration of the vehicle control apparatus 101. As illustrated in FIG. 3, the vehicle control apparatus 101 includes a vehicle information obtainer 111, a drop-off determiner 112, a storage unit 113, a moving-destination determiner 114, a moving instructor 115, a standby-place manager 116, a demand predictor 117, and a vehicle information manager 118.

The vehicle information obtainer 111 obtains vehicle state information from each vehicle 102. The vehicle state information indicates, for example, the state and the location of each vehicle 102.

On the basis of the state of the vehicle 102 which is indicated by the vehicle state information obtained from the vehicle 102, the drop-off determiner 112 determines whether or not the vehicle 102 is dropped off.

The storage unit 113 stores therein standby-place information 121 indicating the locations of standby places, demand prediction information 122 indicating vehicle-demand prediction distribution, and vehicle information 123 indicating the states and the distribution (locations) of the vehicles 102.

When one of the vehicles 102 is dropped off, the moving-destination determiner 114 determines a moving destination of the vehicle 102 among the standby places indicated by the standby-place information 121. More specifically, the moving-destination determiner 114 determines a moving destination among the plurality of standby places on the basis of the current location of the vehicle 102, the locations of the standby places indicated by the standby-place information 121, the vehicle-demand prediction distribution indicated by the demand prediction information 122, and the distribution of the vehicles indicated by the vehicle information 123.

The moving instructor 115 instructs the vehicle 102 to move to the determined moving destination.

The standby-place manager 116 manages the standby places. For example, the standby-place manager 116 periodically obtains, from the vehicles 102, information indicating at which of the standby places the vehicle 102 is on standby or periodically obtains, from each standby place, information indicating whether or not the standby place is vacant and manages whether or not each standby place is vacant on the basis of the obtained information.

The demand predictor 117 determines the vehicle-demand prediction distribution and stores a determination result in the storage unit 113 as the demand prediction information 122.

The vehicle information manager 118 updates the vehicle information 123 on the basis of the vehicle state information of the vehicles 102 which is obtained from the vehicles 102.

Figure 4:
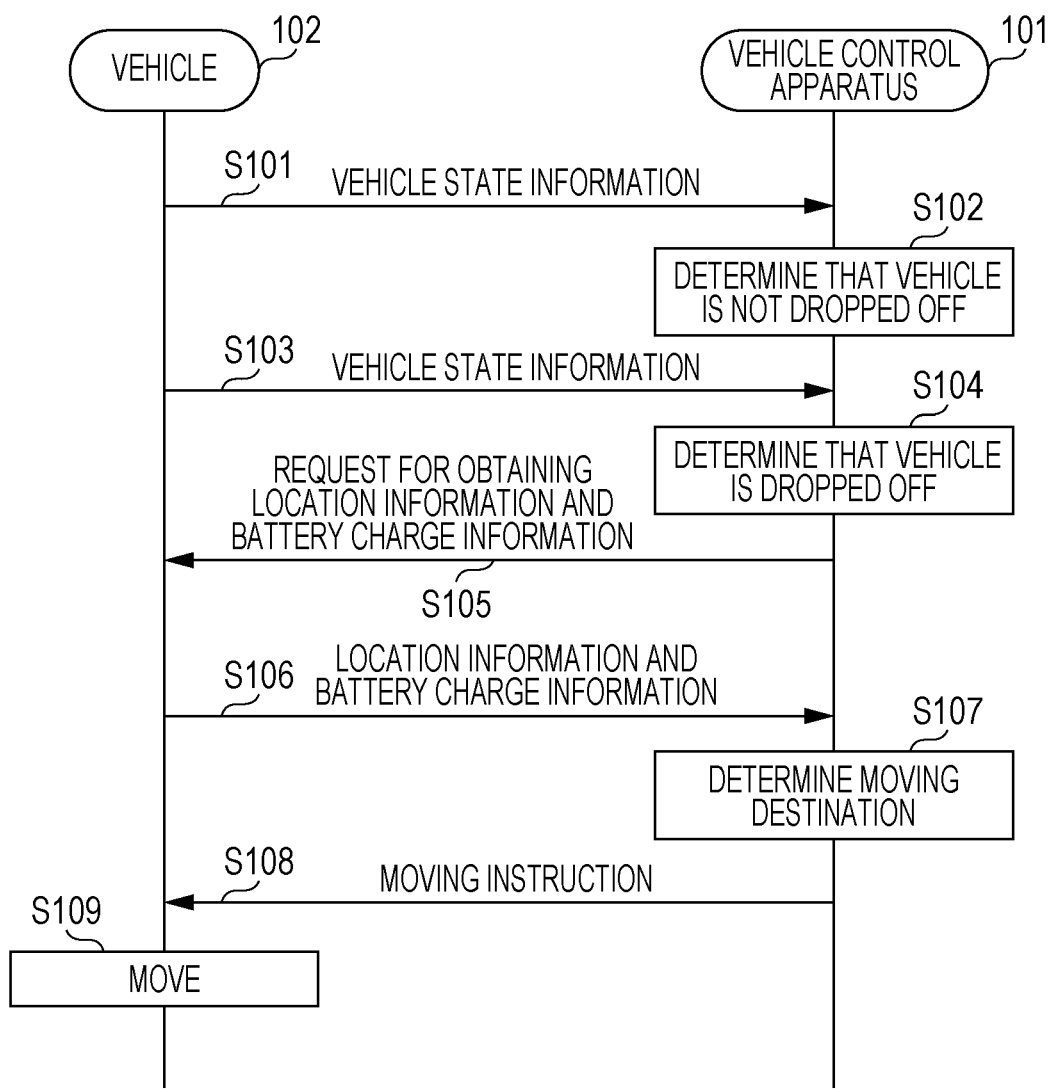
FIG. 4 is a flow diagram illustrating the operations of the vehicle control system according to the first embodiment.

Next, a description will be given of the operation of the vehicle control apparatus 101. FIG. 4 is a flow diagram illustrating the operations of one vehicle 102 and the vehicle control apparatus 101. Although the operation that the vehicle control apparatus 101 performs on one vehicle 102 will be given below for the sake of simplicity, the operation described below is, in practice, performed on each vehicle 102.

As illustrated in FIG. 4, the vehicle 102 periodically transmits vehicle state information to the vehicle control apparatus 101 (S101 and S103). Upon receiving the vehicle state information, the vehicle control apparatus 101 determines whether or not the vehicle 102 is dropped off, by using the vehicle state information (S102 and S104).

Upon determining that the vehicle 102 is dropped off (S104), the vehicle control apparatus 101 transmits, to the vehicle 102, an obtaining request for obtaining location information of the vehicle 102 and battery charge information of the vehicle 102 (S105). Upon receiving the obtaining request, the vehicle 102 transmits the location information and the battery charge information to the vehicle control apparatus 101 (S106).

Next, the vehicle control apparatus 101 determines a moving destination by using the received location information and battery charge information (S107) and transmits, to the vehicle 102, an instruction for moving the vehicle 102 to the determined moving destination (S108). Upon receiving the moving instruction, the vehicle 102 moves to the moving destination indicated by the moving instruction (S109).

In this case, although an example in which the location information and the battery charge information are obtained when it is determined that the vehicle 102 is dropped off is described, the location information and the battery charge information may be included in the vehicle state information and may be periodically transmitted to the vehicle 102.

Figure 5:
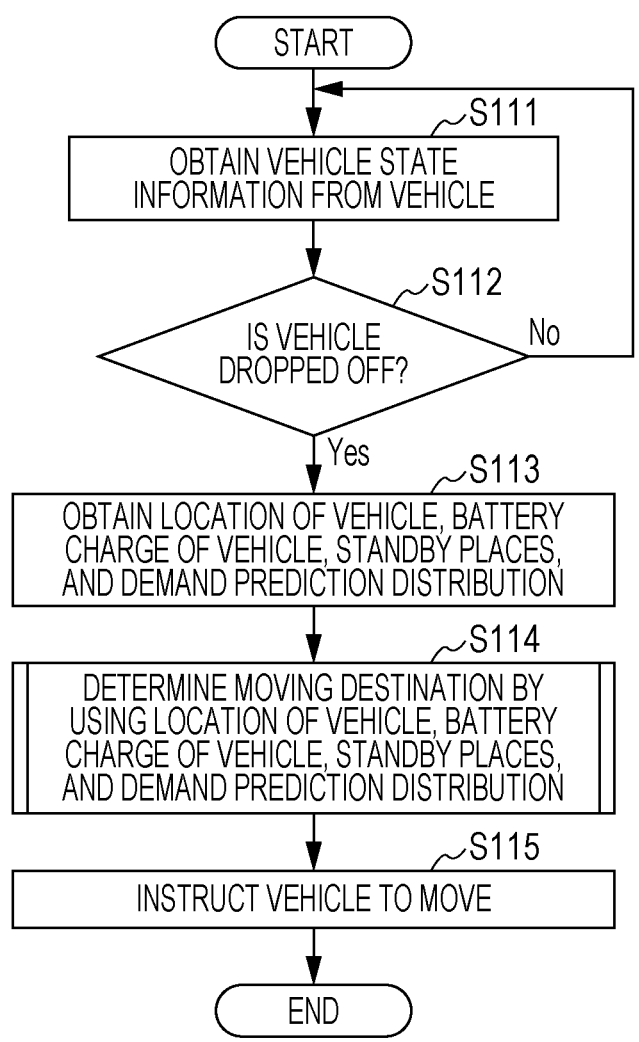
FIG. 5 is a flowchart illustrating processing performed by the vehicle control apparatus according to the first embodiment.

FIG. 5 is a flowchart illustrating the operation of the vehicle control apparatus 101. First, the vehicle information obtainer 111 obtains the vehicle state information from the vehicle 102 (S111).

Next, by using the obtained vehicle state information, the drop-off determiner 112 determines whether or not the vehicle 102 is dropped off (S112).

Specifically, for example, when the user gets out of the vehicle 102, he or she presses a button provided therein. The vehicle state information includes information indicating that the button is pressed. When the vehicle state information includes the information indicating that the button is pressed, the drop-off determiner 112 determines that the vehicle 102 is dropped off. The operation that the user performs when he or she gets out of the vehicle 102 is not limited to pressing the button. Such a user interface does not necessarily have to be provided in the vehicle 102, and the operation may be an input performed via a smartphone, portable terminal, or the like in the possession of the user.

Alternatively, the drop-off determiner 112 may determine whether or not the vehicle 102 is dropped off, on the basis of the state of the vehicle 102 which is indicated by the vehicle state information. For example, the vehicle state information may indicate the speed of the vehicle 102, and based on the speed, the drop-off determiner 112 may determine whether or not the vehicle 102 is dropped off. More specifically, when the speed of the vehicle 102 reaches zero (i.e., enters a stopped state), and this state continues for a predetermined time or more, the drop-off determiner 112 may determine that the vehicle 102 is dropped off.

Alternatively, the drop-off determiner 112 may detect whether or not the user gets out of the vehicle 102 on the basis of the vehicle state information. For example, the drop-off determiner 112 may determine that the vehicle 102 is dropped off, when a door of the vehicle 102 is opened and closed and is locked after the opening and closing. Alternatively, the vehicle state information may indicate a weight that is applied to tires, a suspension, or a seat, and the drop-off determiner 112 may determine that the vehicle 102 is dropped off, when the weight changes (decreases) by a predetermined amount or more. As described above, the drop-off determiner 112 may determine whether or not the vehicle 102 is dropped off, on the basis of a change in the weight applied to the vehicle 102, the opening and closing of a door, or the lock of the door. The drop-off determiner 112 may use a combination of two or more of the above-described determination methods.

If it is determined that the vehicle 102 is not dropped off (No in S112), the vehicle information obtainer 111 obtains the vehicle state information from the vehicle 102 again after a predetermined time elapses (S111), and the drop-off determiner 112 determines whether or not the vehicle 102 is dropped off, by using the obtained vehicle state information (S112).

On the other hand, if it is determined that the vehicle 102 is dropped off (Yes in S112), the moving-destination determiner 114 obtains the location of the dropped off vehicle 102, the battery charge of the vehicle 102, information about the standby places, and the demand prediction distribution (S113). Specifically, the vehicle information obtainer 111 obtains the location of the dropped off vehicle 102 and information indicating the battery charge of the vehicle 102 from the vehicle 102. Also, the information about the standby places and the demand prediction distribution are stored in the storage unit 113 as the standby-place information 121 and the demand prediction information 122.

Next, the moving-destination determiner 114 determines a moving destination by using obtained location of the dropped off vehicle 102, the battery charge of the vehicle 102, the information about the standby places, and the demand prediction distribution (S114). Details of this process are described later.

Lastly, the moving instructor 115 instructs the vehicle 102 to move to the determined moving destination (S115).

Figure 6:
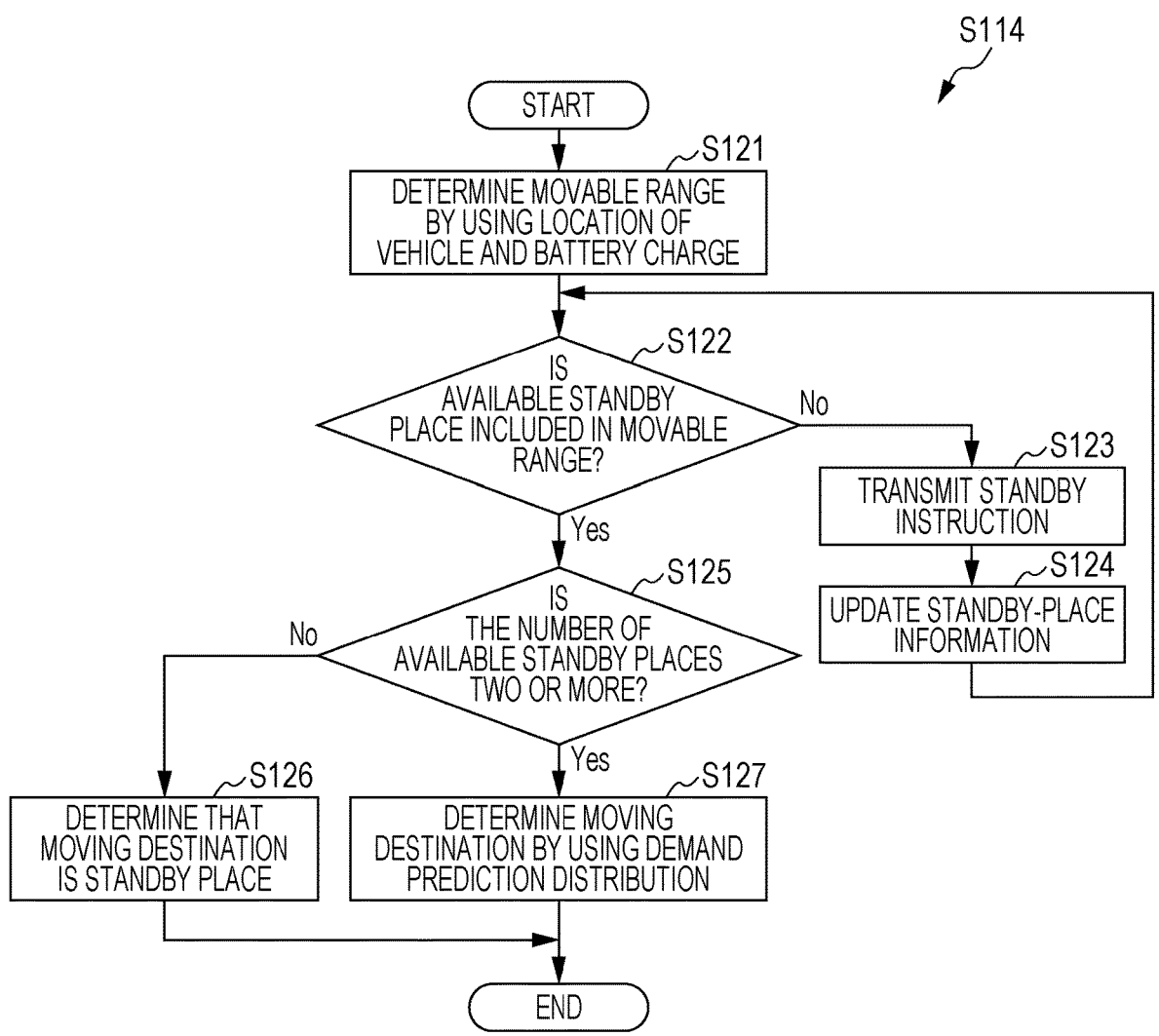
FIG. 6 is a flowchart illustrating moving-destination determination processing according to the first embodiment.

Next, a description will be given of details of the moving-destination determination processing (S114) performed by the moving-destination determiner 114. First, a description will be given of moving-destination determination processing using a demand prediction distribution and a battery charge, FIG. 6 is a flowchart of this processing. FIG. 7 is a table illustrating one example of the standby-place information 121.

As illustrated in FIG. 7, the standby-place information 121 includes, for each standby place, a standby-place ID that is information for identifying the standby place, location information (location (x, y)) indicating the location of the standby place, and usage-state information indicating whether the standby place is in use or vacant (available). Although the location information is indicated by two-dimensional coordinates, the location information may be indicated by three-dimensional coordinates or may be an address or the like.

Also, the standby-place manager 116 sequentially updates the usage-state information. More specifically, for example, the standby-place manager 116 periodically obtains the location information from each of the vehicles 102, and when the obtained location information matches the location information of any of the standby places, the standby-place manager 116 determines that the standby place is in use. The standby-place manager 116 may obtain, from each vehicle 102, information indicating that the vehicle 102 is on standby and the standby-place ID of the standby place that is currently in use and may update the usage-state information on the basis of the obtained information and standby-place ID. Alternatively, the standby-place manager 116 may obtain information indicating whether or not the standby place is in use or vacant from an apparatus installed at the standby place through a communication network or the like and may update the usage-state information on the basis of the obtained information.

Figure 8:
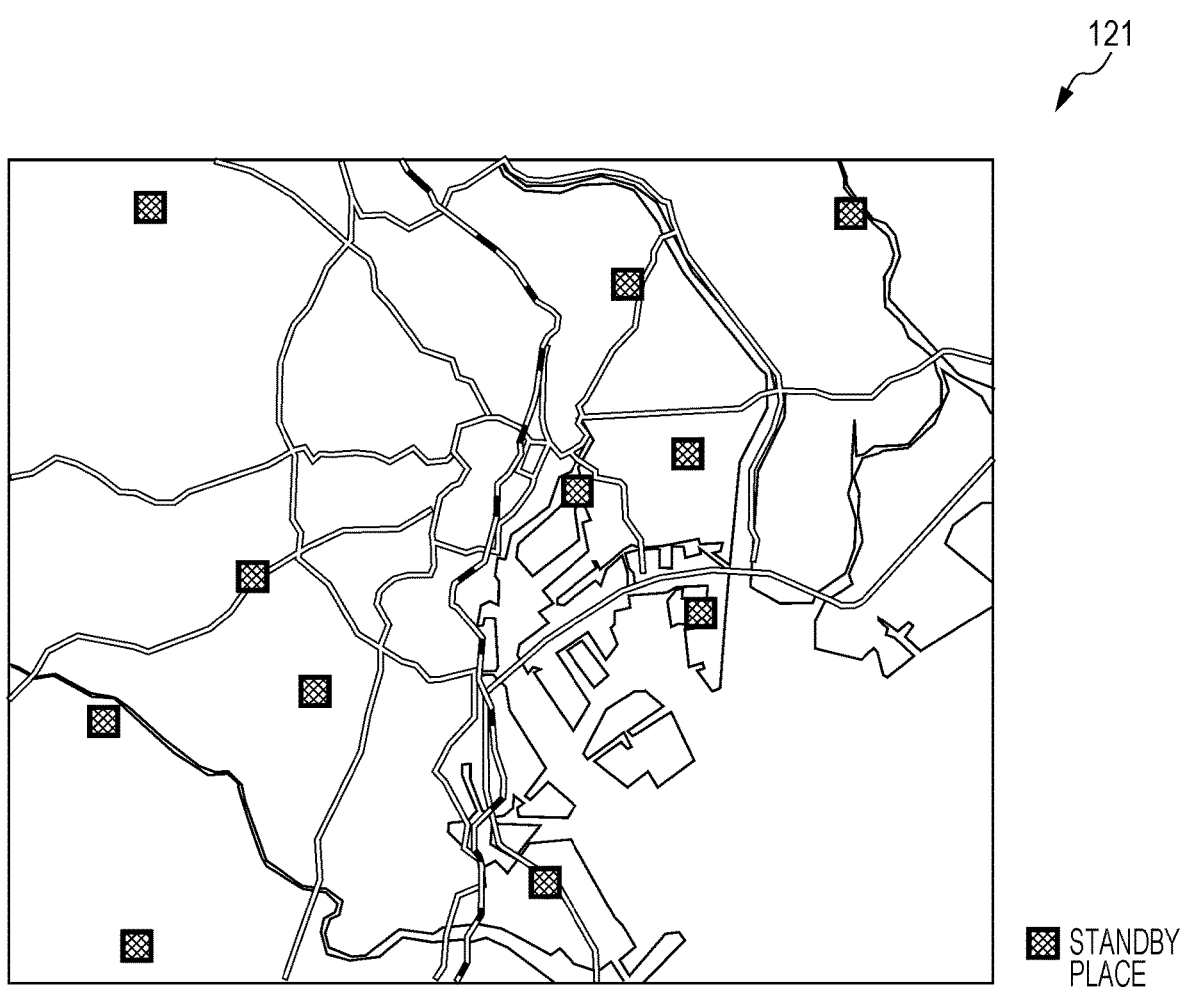
FIG. 8 illustrates one example of standby-place information according to the first embodiment.

Also, the standby-place information 121 may be map information like that illustrated in FIG. 8.

As illustrated in FIG. 6, by using the current location of the vehicle 102 when it is dropped off and the current battery charge of the vehicle 102 when it is dropped off, the moving-destination determiner 114 first determines a movable range that the vehicle 102 can travel on the current battery charge (S121).

Figure 9:
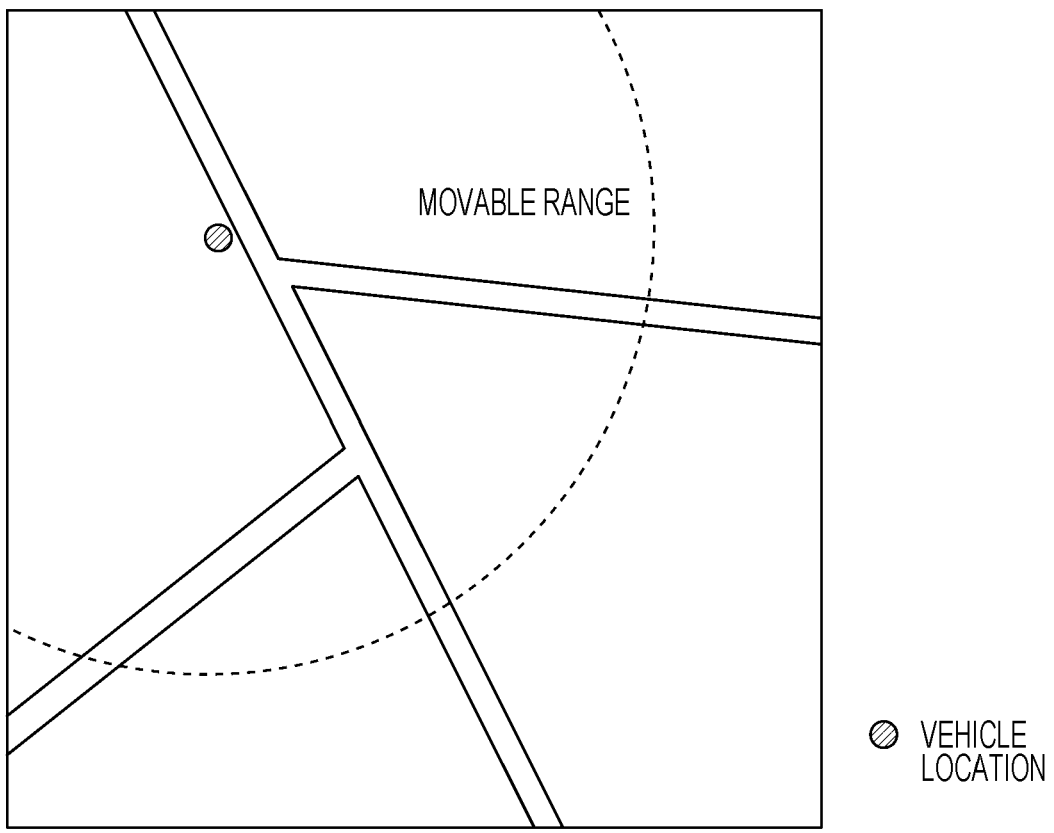
FIG. 9 is a map for describing movable-range determination processing according to the first embodiment.

For example, as illustrated in FIG. 9, the moving-destination determiner 114 determines, as a movable range, a concentric circle having its center at the current location of the vehicle 102. The radius of the concentric circle increases in proportion to the battery charge. The relationship between the radius of the concentric circle and the battery charge may be pre-set or may be determined based on past traveling history of the vehicle 102. When the traveling history is used, the relationship between the radius of the concentric circle and the battery charge, the relationship differing from one vehicle 102 to another, may be set for each vehicle 102, based on the traveling history of the vehicle 102.

Figure 10:
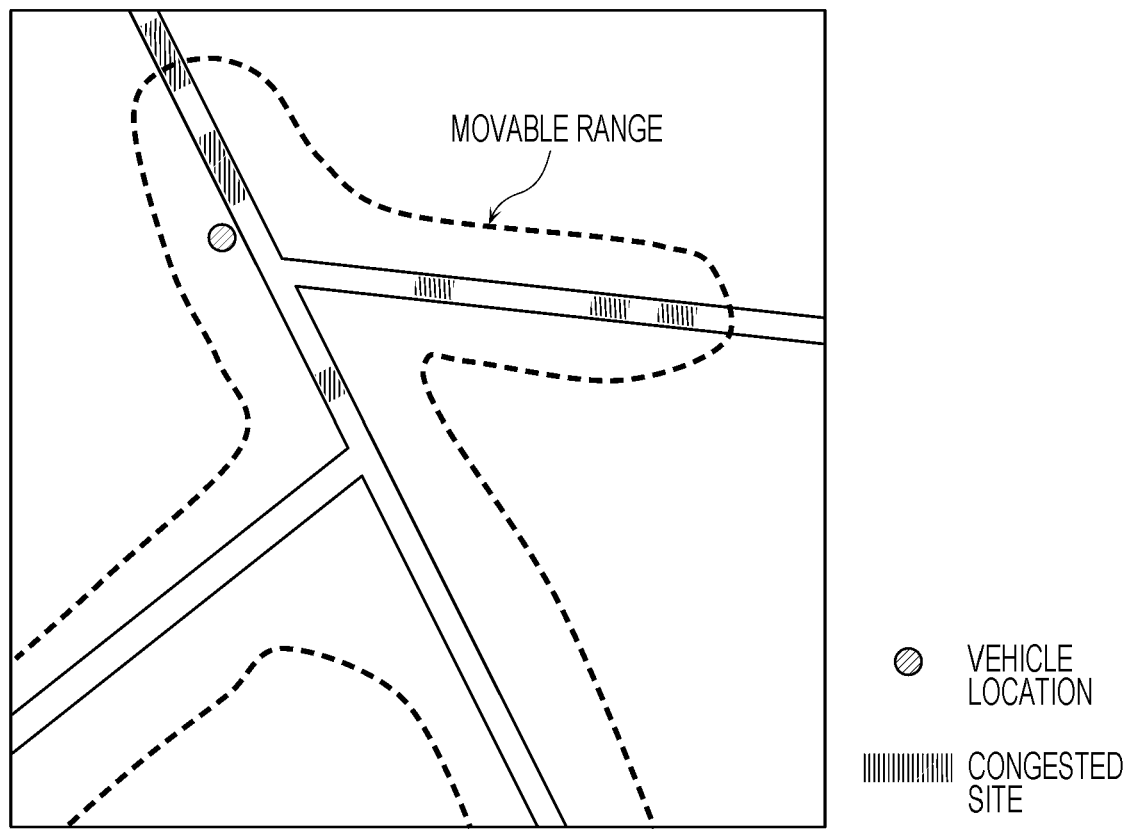
FIG. 10 is a map for describing the movable-range determination processing according to the first embodiment.

Alternatively, as illustrated in FIG. 10, the movable range may be determined considering a road situation or a congestion situation in addition to the battery charge. The congestion situation may be a congestion situation that is set for each day (each day of the week, season, or month) or for each time segment and that corresponds to the current date and time. Also, the information indicating the current congestion state may be obtained from another apparatus through a communication network or the like. The congestion situation may be predicted from a past congestion situation. The congestion situation may also be predicted from moment to moment when the vehicle 102 is moving.

For example, in the example illustrated in FIG. 10, since the degrees of congestion on roads in two upper and right directions are high, the movable range is small, and since the degrees of congestion on roads in two lower and left directions are low, the movable range is large.

Next, the moving-destination determiner 114 determines a plurality of moving-destination candidates included in the movable range. First, the moving-destination determiner 114 determines whether or not an available standby place is included in the movable range (S122). When an available standby place is not included in the movable range (No in S122), the moving-destination determiner 114 transmits a standby instruction to the vehicle 102 via the moving instructor 115 (S123). In response to the standby instruction, the vehicle 102 stands by at the current place. Also, the moving-destination determiner 114 updates the standby-place information 121 after a predetermined time elapses (S124) and performs the process in steps 3122 again by using the updated standby-place information 121. Thus, at a timing at which a standby place close to the vehicle 102 becomes vacant, an instruction for moving to the standby place is given.

On the other hand, if an available standby place is included in the movable range (Yes in S122), the moving-destination determiner 114 determines whether or not a plurality of available standby places is included in the movable range (S125). If a plurality of available standby places is not included in the movable range, that is, only one available standby place is included in the movable range (No in S125), the moving-destination determiner 114 determines that the moving destination is the standby place (S126).

On the other hand, if a plurality of available standby places is included in the movable range (Yes in S125), the moving-destination determiner 114 determines a moving destination among the moving-destination candidates that are the available standby places included in the movable range, by using the demand prediction distribution (S127).

Figure 11:
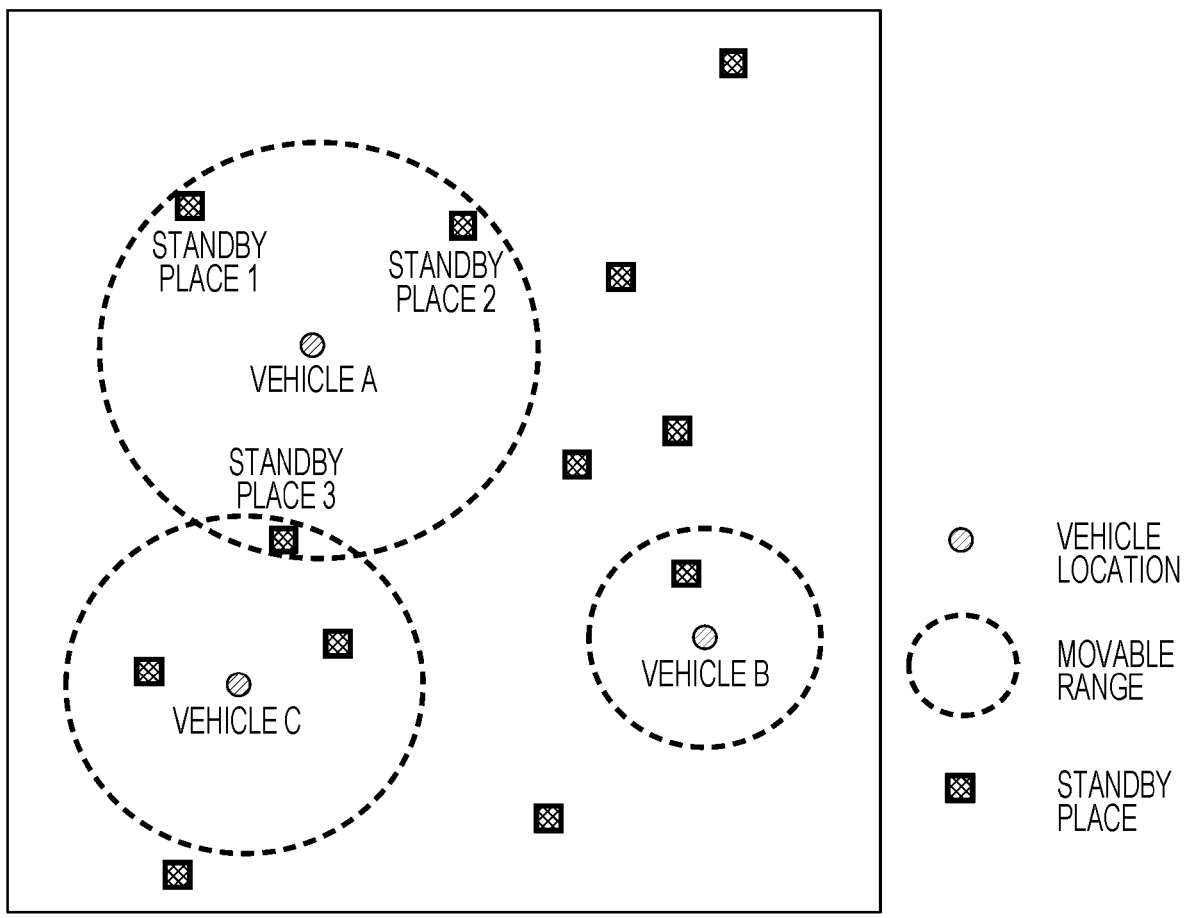
FIG. 11 is a diagram illustrating one example of movable ranges according to the first embodiment.

FIG. 11 illustrates one example of moving-destination candidates. FIG. 11 illustrates only available standby places among the standby places. In this example, three moving-destination candidates, that is, standby places 1, 2, and 3, exist for vehicle A.

Figure 12:
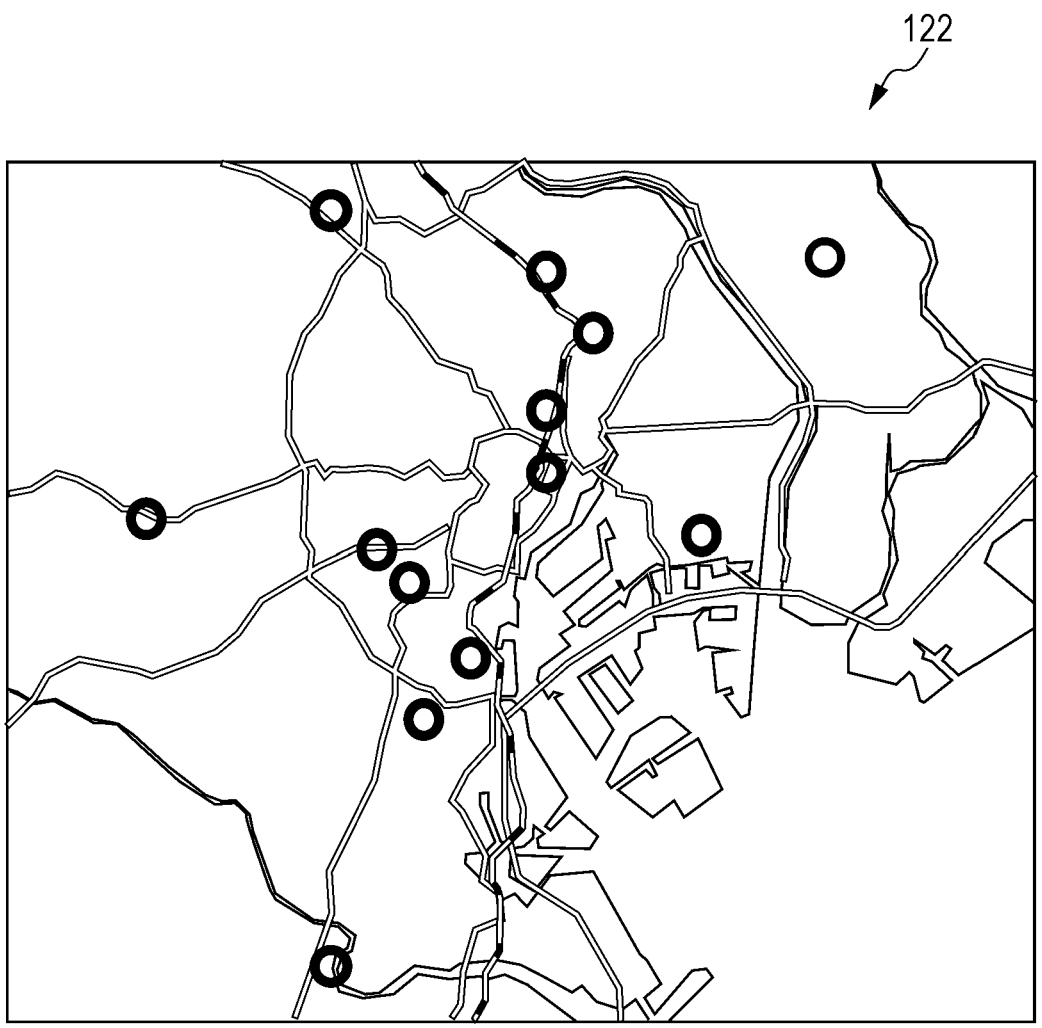
FIG. 12 is a map illustrating one example of demand prediction information according to the first embodiment.

FIG. 12 is a map illustrating one example of the demand prediction information 122. As illustrated in FIG. 12, the demand prediction information 122 indicates, for example, spots where the appearance frequency of users of the vehicles 102 is high. The appearance frequency of users of the vehicles 102 may be set in a stepwise manner.

Figure 13:
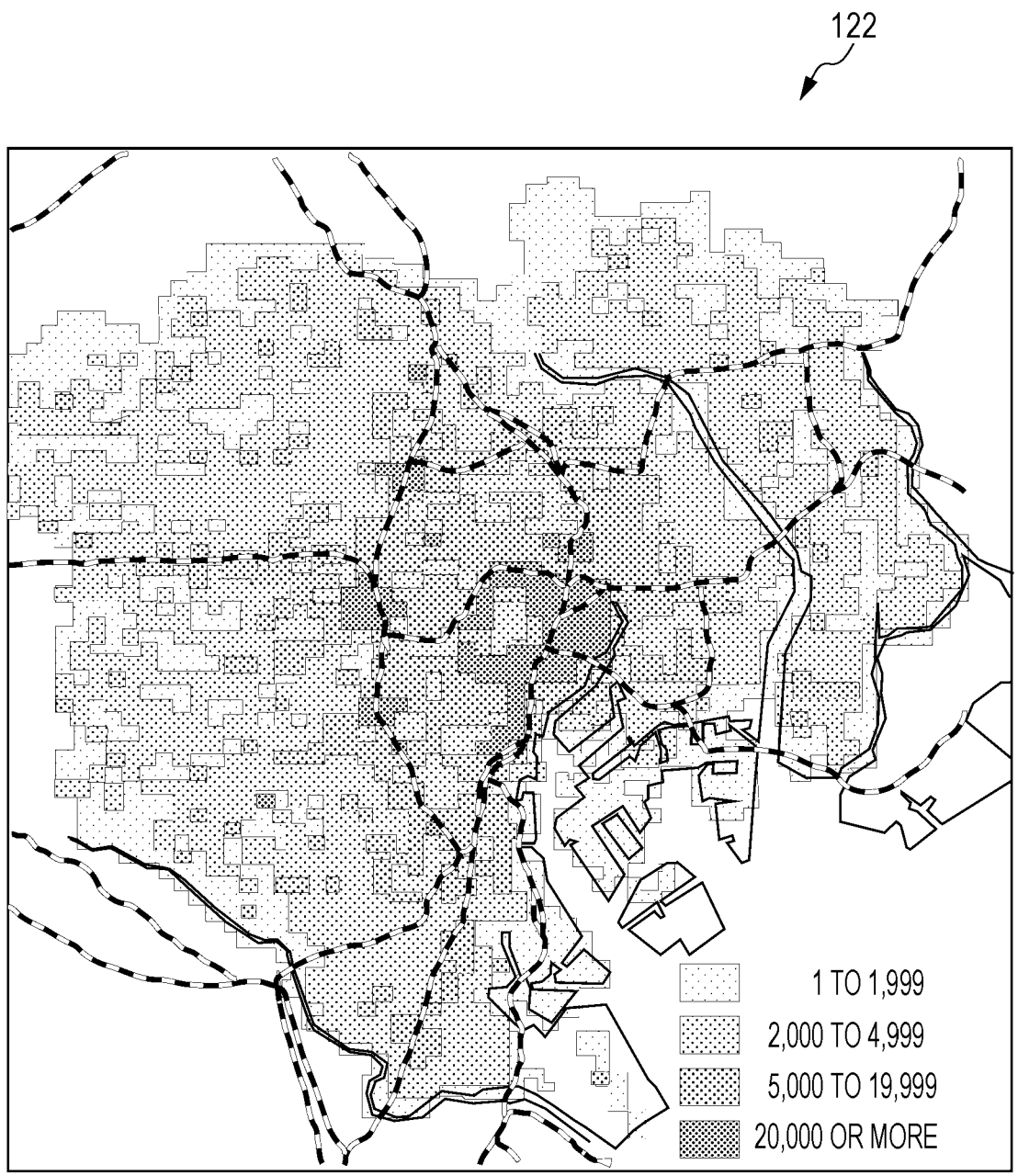
FIG. 13 is a map illustrating one example of the demand prediction information according to the first embodiment.

The demand prediction information 122 may also be determined based on a population distribution like that illustrated in FIG. 13. That is, the demand predictor 117 determines a demand prediction distribution on the basis of a population distribution obtained externally. Specifically, the demand predictor 117 determines that the larger the population is, the higher the demand is.

The demand predictor 117 may also determine the population distribution or the demand prediction distribution, considering a distribution of building (e.g., planer information of buildings). For example, the demand predictor 117 may determine the population distribution or the demand prediction distribution, considering the distribution of the volumes or the floor areas of buildings. Specifically, the demand predictor 117 may determine that the larger the volume or the floor area of buildings is, the larger the population or the demand is.

Also, the demand predictor 117 may determine the population distribution or the demand prediction distribution, considering a resident map. That is, the demand predictor 117 may determine that the larger the number of residents is, the larger the population or the demand is.

The demand predictor 117 may also determine a different demand prediction distribution at each time point. For example, the demand predictor 117 may generate a demand prediction distribution for daytime by using a daytime population map and may generate a demand prediction distribution for nighttime by using a nighttime population map.

The demand predictor 117 may also generate a dynamic demand prediction distribution by using real-time information. For example, the demand predictor 117 may generate a dynamic population distribution by using real-time information and may generate a dynamic demand prediction distribution by using the generated population distribution.

For example, the demand predictor 117 may determine a dynamic demand prediction distribution on the basis of dynamic (real-time) power consumption data. For example, the demand predictor 117 generates a dynamic population distribution by analyzing electric-power data of smart meters in a corresponding area. That is, the demand predictor 117 determines that the population is larger (the demand is higher) in an area where the power consumption is larger.

Alternatively, the demand predictor 117 may determine a dynamic demand prediction distribution on the basis of dynamic sales data of stores. Specifically, the demand predictor 117 generates the dynamic population distribution by analyzing sales states of stores in a corresponding area. That is, the demand predictor 117 determines that the population is larger (the demand is higher) in an area where sales is higher. For example, the demand predictor 117 generates the dynamic population distribution by collecting point-of-sale (POS) data of stores and analyzing it.

Alternatively, the demand predictor 117 may generate the demand prediction distribution by using a past usage history. Specifically, the demand predictor 117 identifies past usage-start locations on the basis of global positioning system (GPS) data of each vehicle 102 and determines that the demand is higher in an area where locations therein were used as the usage-start locations a larger number of times.

Alternatively, the demand predictor 117 may obtain information about a tendency of getting in and out of taxis and may determine that the demand is higher in an area where the number of passengers who get in the taxis is larger.

Alternatively, the demand predictor 117 may determine the dynamic demand prediction distribution on the basis of the current weather or weather forecast information. Specifically, the demand predictor 117 determines that the demand is high in a region where rain is falling or a region where rain is expected to fall from now.

The demand predictor 117 may make the determination by combining two or more of the above-described schemes.

Figure 14:
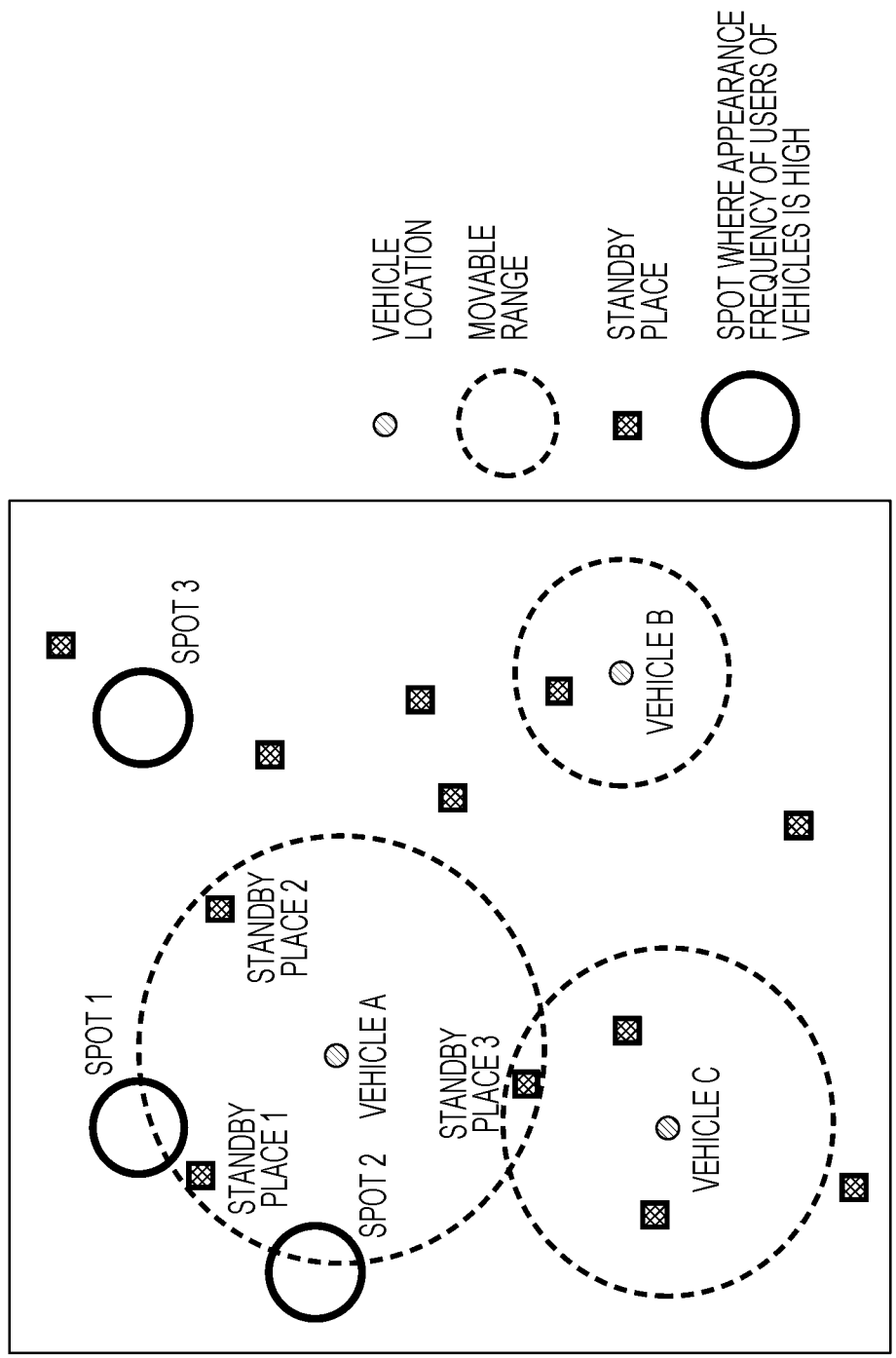
FIG. 14 is a diagram for describing moving-destination determination processing according to the first embodiment.

FIG. 14 is a diagram for describing an operation when the demand prediction distribution is information indicating spots where the appearance frequency of users of the vehicles 102 is high as in the case illustrated in FIG. 12. In the example illustrated in FIG. 14, three standby places 1 to 3 exist in one movable range. Also, the distances from vehicle A to standby places 1 to 3 are generally equal to each other. In this case, the moving-destination determiner 114 determines that the moving destination is standby place 1, which is close to spots 1 and 2 where the appearance frequency of users of the vehicles 102 is high.

Although an example in which the standby places in the movable range determined according to the battery charge are determined to be moving-destination candidates, standby places included in a predetermined range may be determined to be moving-destination candidates, and the moving destination may be determined among the moving-destination candidates on the basis of the demand prediction distribution.

For example, when the battery charge is greater than a predetermined threshold, the battery charge does not necessarily have to be used. Also, the battery charge does not necessarily have to be used in a particular region where there are many standby places.

Figure 15:
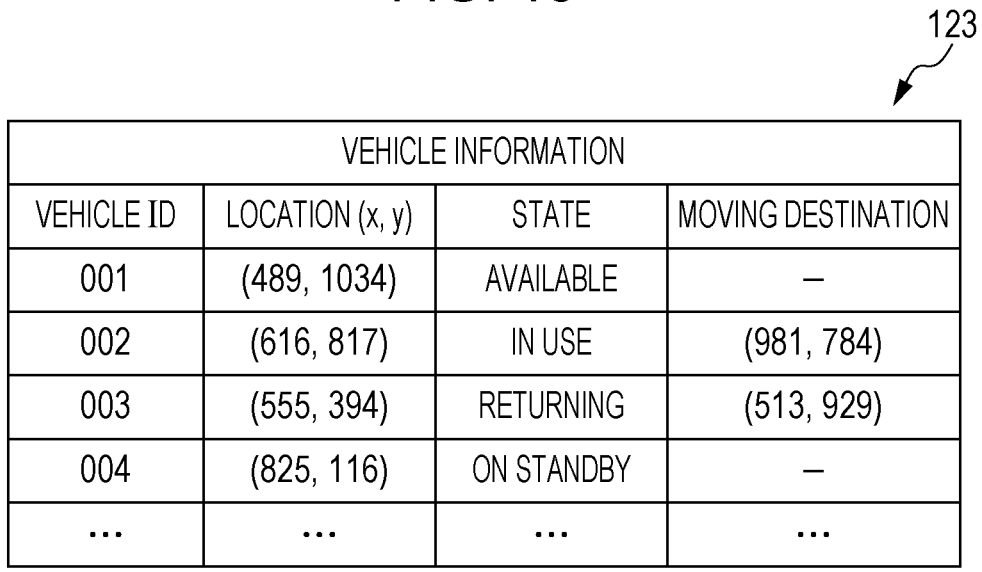
FIG. 15 is a table illustrating one example of vehicle information according to the first embodiment.

The moving-destination determiner 114 may further determine the moving destination by using the distribution of the vehicles 102. FIG. 15 is a table illustrating one example of the vehicle information 123. As illustrated in FIG. 15, the vehicle information 123 indicates, for each vehicle 102, a vehicle ID for identifying the vehicle 102, the current location (location (x, y)) of the vehicle 102, the usage state of the vehicle 102, and the moving destination of the vehicle 102.

The usage state in this case includes a state in which the vehicle 102 is stopped (available) at a standby place, a state in which the vehicle 102 is being used (in use) by a user, a state in which the vehicle 102 is moving (returning) to a standby place after drop-off, and a state in which the vehicle 102 is standing by (on standby) at the current place after drop-off. Also, when the vehicle 102 is in use, the destination thereof is set as a moving destination, and when the vehicle 102 is returning, the standby place in the vicinity of the moving destination is set as a moving destination.

These pieces of information are periodically transmitted from the vehicles 102 to the vehicle control apparatus 101. Although the current location and the moving destination are indicated by two-dimensional coordinates, they may be indicated by three-dimensional coordinates or may be addresses or the like. When the current location or the moving destination matches any of the standby place, the standby-place ID thereof may be used.

Figure 16:
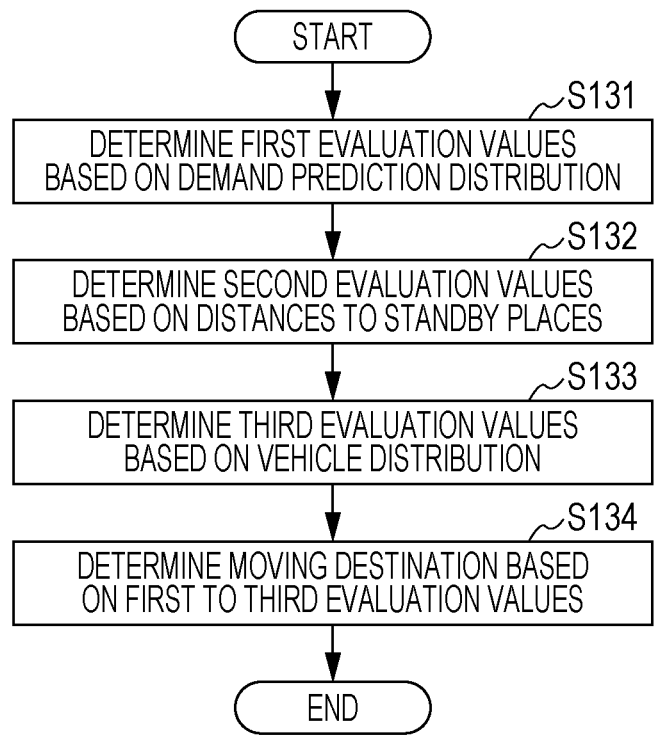
FIG. 16 is a flowchart illustrating the moving-destination determination processing according to the first embodiment.

FIG. 16 is a flowchart of moving-destination determination processing performed by the moving-destination determiner 114 when the distribution of the vehicles 102 is used, First, the moving-destination determiner 114 determines first evaluation values for the respective moving-destination candidates on the basis of the demand prediction distribution (S131). Specifically, the moving-destination determiner 114 sets the first evaluation value higher for a standby place located in an area where the demand prediction is high or for a standby place that is close to an area where the demand prediction is high. When the demand prediction indicates a demand level, the moving-destination determiner 114 sets the first evaluation value higher for a standby place located in an area where the demand level is high or a standby place that is close to an area where the demand level is high.

Next, the moving-destination determiner 114 determines second evaluation values for the respective moving-destination candidates on the basis of the distances from the current location to the standby places (S132). Specifically, the moving-destination determiner 114 increases the second evaluation value, as the distance from the current location to the standby place decreases. When the congestion situation or the like is considered, a time taken for the movement may be used instead of the distance. In this case, the moving-destination determiner 114 increases the second evaluation value, as the time taken for the movement gets shorter.

Next, the moving-destination determiner 114 determines third evaluation values for the respective moving-destination candidates on the basis of the distribution of the vehicles 102 (S133). Specifically, the moving-destination determiner 114 sets the third evaluation value lower for an area where a larger number of vehicles exist or for an area around which a larger number of vehicles exist. The vehicles used in the determination in this case are available vehicles (e.g., available vehicles in FIG. 15). Taking into account vehicles that are currently moving, the moving-destination determiner 114 may determine the third evaluation values on the basis of a vehicle distribution after a predetermined time elapses.

Lastly, the moving-destination determiner 114 determines the moving destination on the basis of the first, second, and third evaluation values (S134). For example, the moving-destination determiner 114 calculates final evaluation values by adding up the first, second, and third evaluation values for the respective moving-destination candidates and determines, as the moving destination, the moving-destination candidate with which the final evaluation value is the largest.

Although, in the above description, the moving-destination determiner 114 independently calculates the first evaluation values and the third evaluation values, it may calculate an insufficient number of vehicles in each area on the basis of the demand prediction and the vehicle distribution and determines the evaluation values on the basis of the insufficient number of vehicles. That is, the moving-destination determiner 114 sets the evaluation value higher for a standby place that is located in an area where the number of vehicles is not sufficient or an area that is close to an area where the number of vehicles is not sufficient.

In addition, although FIG. 3 illustrates an example in which the vehicle control apparatus 101 is implemented as a single apparatus (e.g., a server) that is independent from the vehicles 102, the functions of the vehicle control apparatus 101 may be implemented by a plurality of apparatuses that can communicate with each other. For example, the standby-place manager 116, the demand predictor 117, and the vehicle information manager 118 may be provided in independent apparatuses, and the vehicle control apparatus 101 may obtain the standby-place information 121, the demand prediction information 122, and the vehicle information 123 generated by the apparatuses and store the obtained information in the storage unit 113.

Figure 17:
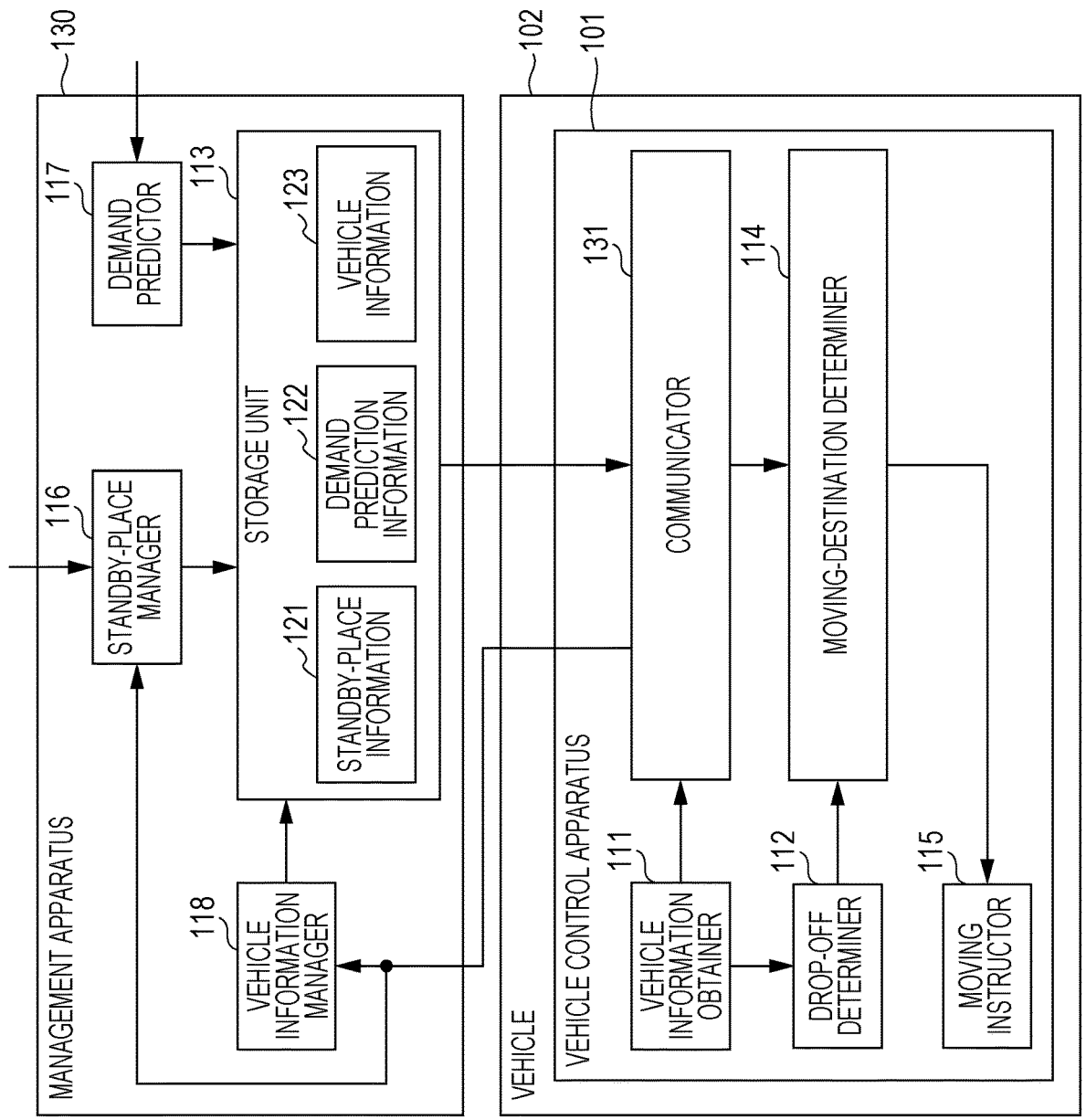
FIG. 17 is a block diagram illustrating the configuration of a vehicle control apparatus according to a modification of the first embodiment.

Also, some of the functions of the vehicle control apparatus 101 may be provided in each vehicle 102. FIG. 17 is a block diagram illustrating an example in which some of the functions vehicle control apparatus 101 are provided in each vehicle 102. In the example illustrated in FIG. 17, the vehicle control apparatus 101 in the vehicle 102 includes the vehicle information obtainer 111, the drop-off determiner 112, the moving-destination determiner 114, and the moving instructor 115, which are described above. Also, a management apparatus 130, which is a server or the like, is provided external to the vehicle 102 and includes the storage unit 113, the standby-place manager 116, the demand predictor 117, and the vehicle information manager 118, which are described above.

The vehicle control apparatus 101 includes a communicator 131 that communicates with the management apparatus 130. The communicator 131 transmits the vehicle state information and receives the standby-place information 121, the demand prediction information 122, and the vehicle information 123.

As described above, when the vehicle 102 is dropped off, the vehicle control apparatus 101 according to the present embodiment determines a moving destination among a plurality of standby places on the basis of the current location of the vehicle 102, the locations of the standby places, and the vehicle-demand prediction distribution. Thus, the vehicle control apparatus 101 can allocate each dropped off vehicle to an appropriate location by using the vehicle-demand prediction distribution.

In addition, when one vehicle 102 is dropped off, the vehicle control apparatus 101 determines the moving destination on the basis of the current battery charge of the vehicle 102. Thus, the vehicle control apparatus 101 can allocate the dropped off vehicle 102 to an appropriate location, taking into account the battery charge of the vehicle 102.

In addition, when the vehicle 102 is dropped off, the vehicle control apparatus 101 determines the moving destination on the basis of the distribution of the vehicles 102. Thus, the vehicle control apparatus 101 can allocate the dropped off vehicle 102 to an appropriate location, taking the distribution of the vehicles 102 into account.

There are also cases in which, when the vehicle 102 is dropped off, the distribution of the vehicles 102 is unbalanced and differs from an allocation corresponding to the distribution of users who wish to use the vehicles 102. In this case, there are cases in which no vehicle 102 is allocated to a place near a user who wishes to use the vehicle 102, and thus the user cannot use the vehicle 102.

As described above, after one user finishes using one of the vehicles 102, the vehicle control apparatus 101 according to the present embodiment moves the vehicle 102 in order to prepare for a next user. That is, the vehicle control apparatus 101 allocates the vehicles 102 in accordance with the distribution of users who wish to use the vehicles 102. This makes it possible to realize an environment where the vehicle 102 is always allocated to a place near a user when he or she wishes to use the vehicle 102.

The vehicle control system 100 can also be applied to a system as described below.

First, a user gives an instruction indicating his or her current location and a destination by using a tablet terminal or the like. On the basis of the conditions indicated by the instruction, the vehicle 102, which may be a community car, is sent to the user's current location.

After the user finishes using the vehicle 102, when he or she presses an "end" button provided in the vehicle 102 or the like, a usage fee is settled with credit.

In accordance with an instruction from a central office, the vehicle 102 after use is sent to a parking place or a place where a next user called for a vehicle.

A place to which the vehicle 102 is to be sent is determined based on the demand prediction, destination prediction, or the like, which is based on a time segment, weather forecast, a past usage situation, and so on.

When a reservation for using one of the vehicles 102 is made, one of the vehicles 102 which is the most appropriate therefor is dispatched. Specifically, the amount of time to be taken for picking up the user, a distance that can be traveled, or the like is taken into account. Also, when the vehicle 102 returns from a destination, for example, the following possible uses are taken into account.

For example, even when the vehicle 102 is used from the same site to the same destination, the vehicle 102 may stand by or may return to a different place after the use, depending on the time segment, weather prediction after the use, or the like. For example, in the early evening, a large number of vehicles are allocated to places in the vicinity of stations or the like, and in the morning, a large number of vehicles are allocated to places in the vicinity of residential areas or the like.

When a reservation for using the vehicle 102 is made when it is traveling to a place to which it should return, or when a request for using the vehicle is received when the vehicle is traveling on a schedule route, a route is changed upon approval by the central office.

Machine learning may be used for the above-described demand prediction. For example, machine learning may be performed using, as inputs, various parameters, including time segments, weather, and so on, and history information about sites where the vehicles 102 were actually used. Since the demand varies, the machine learning may be performed so that higher priority is given to a newer parameter and newer history information.

Although the above description has been given of the vehicle control apparatus 101 and the vehicle control system 100 according to the present embodiment, the present disclosure is not limited to the embodiment.

For example, although an example in which people are transported has been described above, the scheme of the present embodiment is also applicable to cases in which objects are transported.

In addition, although the above description has been given of an example of a case in which the vehicles 102 are electrically powered vehicles, the power sources for the vehicles 102 are not limited to electric power and may be any known power source. The vehicles 102 may also be hybrid cars or the like using a plurality of power sources.

Second Embodiment

In a second embodiment, a description will be given of a bicycle sharing system that can reduce an imbalance in the distribution of bicycles.

Figure 18:
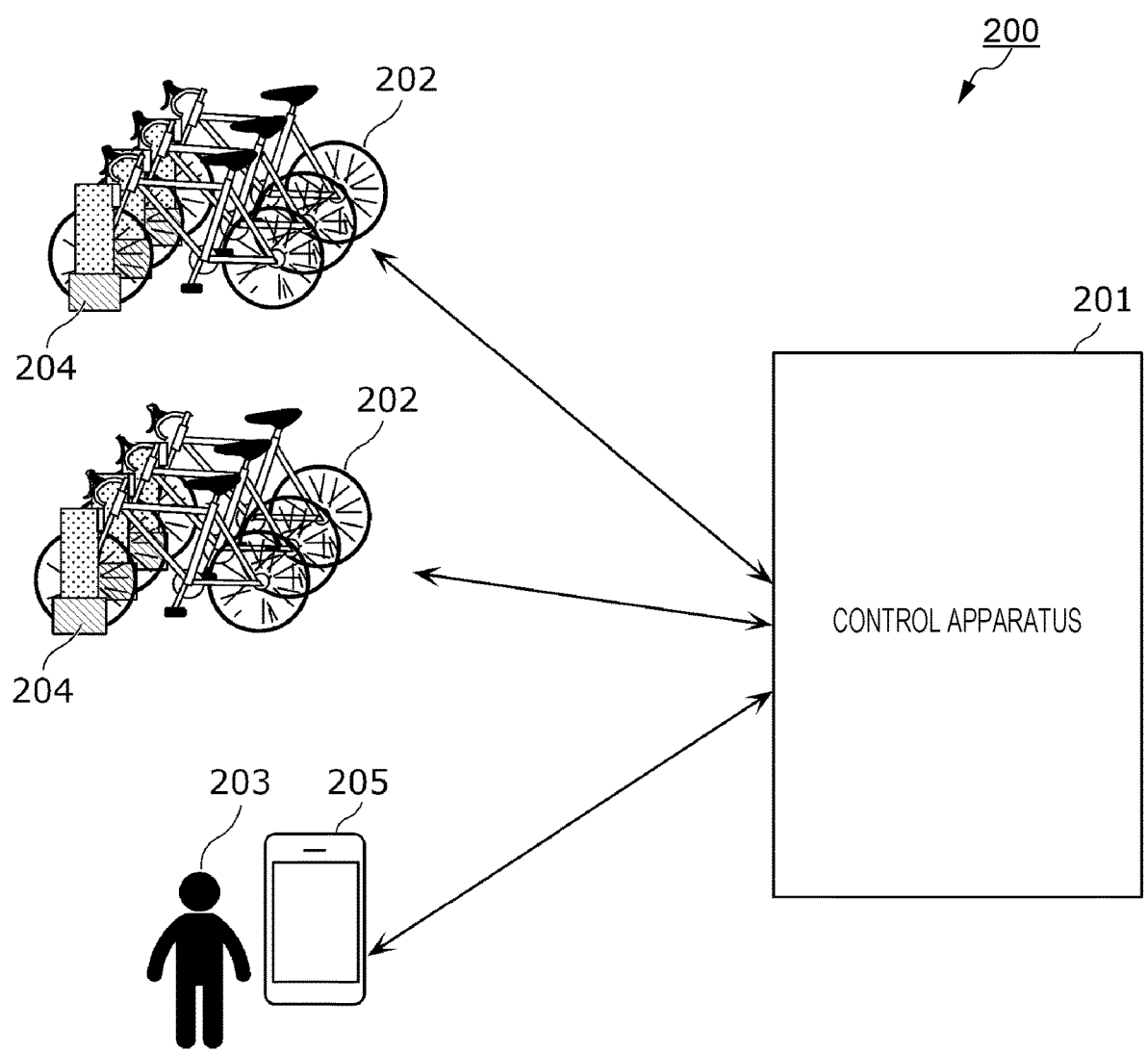
FIG. 18 illustrates the configuration of a bicycle sharing system according to a second embodiment.

First, a description will be given of the configuration of a bicycle sharing system according to the present embodiment. FIG. 18 illustrates the configuration of a bicycle sharing system 200 according to the present embodiment. As illustrated in FIG. 18, the bicycle sharing system 200 includes a control apparatus 201, a plurality of bicycles 202, a plurality of docking stations 204, and one or more user terminals 205.

The docking stations 204 are provided at standby places. During standby, each bicycle 202 is coupled to the docking station 204 and is locked.

Each user terminal 205 is a terminal carried by a user 203 with him or her and is, for example, a smartphone. The user terminal 205 is not limited to a smartphone and may be a smart watch, a dedicated terminal, a head-mounted display, or the like.

For example, the user 203 installs a dedicated application to his or her user terminal 205 and registers the user terminal 205 with the bicycle sharing system 200 in advance. Next, at any of the docking stations 204, the user 203 places the user terminal 205 over a reader or the like provided on the docking station 204 or the bicycle 202, so that user authentication is performed. As a result, a lock is released to allow the user 203 to use the bicycle 202. This use method is one example, and the user authentication may be performed using an authentication card, a passcode, or the like that the user 203 is notified of in advance.

Also, after using the bicycle 202, the user 203 returns the bicycle 202 by locking the bicycle 202 to any of the docking stations 204.

The control apparatus 201 can communicate with the docking stations 204, the bicycles 202, and the user terminal 205 through a communication network or the like. The communication may be indirectly performed via another apparatus. The control apparatus 201 performs user management and so on as described above.

Such a system allows a plurality of users 203 to share the plurality of bicycles 202. Also, since each user 203 does not have to return the bicycle 202 to a place where he or she rents the bicycle 202 and can return the bicycle 202 to any of the docking station 204, thus making it possible to improve the convenience of the user 203.

Meanwhile, since each user 203 can return the bicycle 202 to any of the docking stations 204, a problem that the distribution of the bicycles 202 becomes unbalance occurs. Consequently, cases in which no bicycle 202 remains at a place where any of the users 203 wishes to rent the bicycle 202 occur, thus reducing the convenience of the users 203. In addition, a problem that the cost or moving the bicycles 202 is required arises. In the present embodiment, a description will be given of a scheme that can reduce such an imbalance in the distribution of the bicycles 202.

Figure 19:
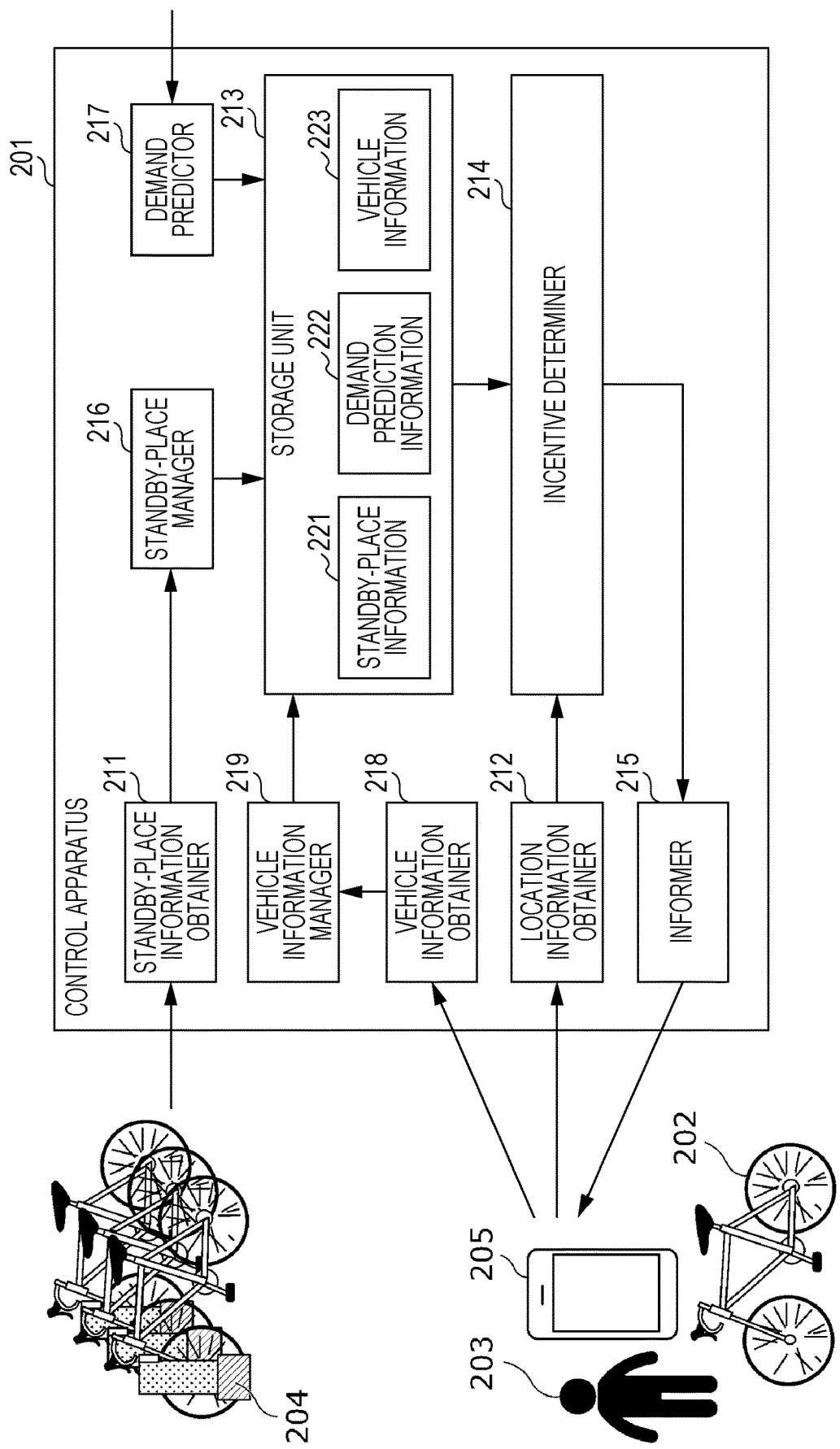
FIG. 19 is a block diagram illustrating the configuration of a control apparatus according to the second embodiment.

FIG. 19 is a block diagram illustrating the configuration of the control apparatus 201. As illustrated in FIG. 19, the control apparatus 201 includes a standby-place information obtainer 211, a location information obtainer 212, a storage unit 213, an incentive determiner 214, an informer 215, a standby-place manager 216, a demand predictor 217, a vehicle information obtainer 218, and a vehicle information manager 219.

The standby-place information obtainer 211 obtains number-of-standby-bicycles information, which indicates the number of bicycles 202 on standby at standby places, from the docking stations 204.

The storage unit 213 stores therein standby-place information 221 indicating the number of bicycles 202 that are on standby at each of the standby places, bicycle-demand prediction information 222 indicating the bicycle-demand prediction distribution, and vehicle information 223 indicating the locations, the states, and so on of the bicycles 202.

The standby-place manager 216 manages the states of the standby places. Specifically, the standby-place manager 216 updates the standby-place information 221 by using the number-of-standby-bicycles information obtained by the standby-place information obtainer 211.

The location information obtainer 212 obtains the current locations of the users 203 from the user terminals 205 or the bicycles 202.

The incentive determiner 214 determines, among the standby places, recommended sites that are the standby places where incentives are to be given to the user 203 when the user 203 moves (i.e., returns the bicycle 202) to the corresponding standby places. The incentive determiner 214 also determines each incentive to be given to the user 203 when the user 203 moves to the corresponding recommended sites.

More specifically, the incentive determiner 214 determines the recommended sites and the incentives on the basis of the number of bicycles 202 on standby at the standby places and the bicycle-demand prediction information 222.

The informer 215 informs the corresponding user 203 of the determined recommended sites and the incentives.

The demand predictor 217 calculates the demand prediction distribution of the bicycles 202 and stores a calculation result in the storage unit 213 as the bicycle-demand prediction information 222.

The vehicle information obtainer 218 obtains vehicle state information from the bicycles 202. The vehicle state information indicates, for example, the states and the locations of the respective vehicles 202.

On the basis of the vehicle state information obtained from the bicycles 202, the vehicle information manager 219 updates the vehicle information 223.

Figure 20:
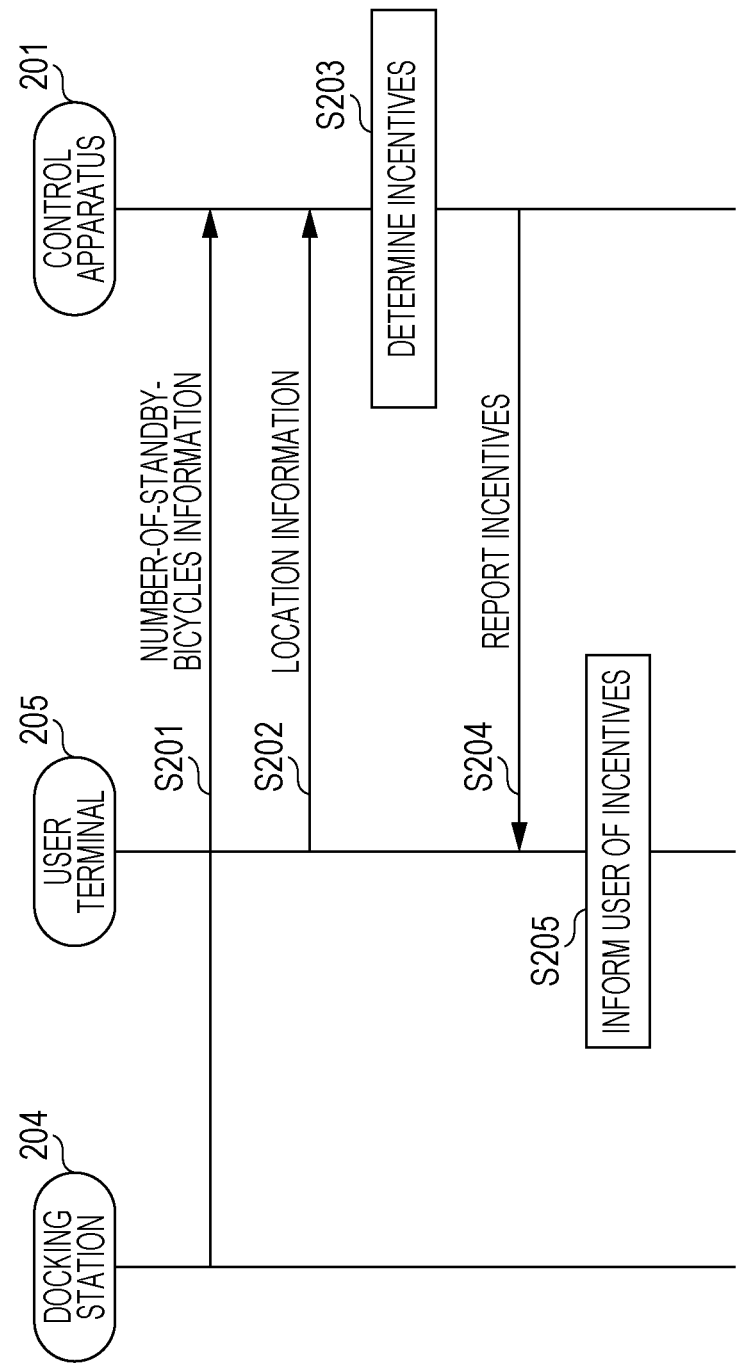
FIG. 20 is a flow diagram illustrating the operation of the bicycle sharing system according to the second embodiment.

Next, a description will be given of the operation of the bicycle sharing system 200, FIG. 20 is a flow diagram illustrating the operation of the bicycle sharing system 200.

As illustrated in FIG. 20, the docking station 204 transmits the number-of-standby-bicycles information, which indicates the number of bicycles 202 on standby at each docking station 204, to the control apparatus 201 periodically or in accordance with an instruction from the control apparatus 201 (S201). Although FIG. 20 illustrates only one docking station 204, the number-of-standby-bicycles information is transmitted from each of the docking stations 204.

Each user terminal 205 transmits location information indicating the location of the user terminal 205 (i.e., the location of the user 203) to the control apparatus 201 periodically or in accordance with a predetermined trigger. The "predetermined trigger" in this case refers to an operation that the user 203 performs on the user terminal 205, placement of the user terminal 205 over the docking station 204, or the like. The location information is obtained, for example, from a GPS or the like provided in the user terminal 205.

The location information does not necessarily have to be transmitted. The location information may also be obtained using a GPS or the like provided on the bicycle 202 or in the docking station 204.

After S202, the control apparatus 201 determines recommended sites and respective incentives by using the received number-of-standby-bicycles information and location information (S203). Next, the control apparatus 201 reports the determined recommended sites and incentives to the user terminal 205 (S204). The user terminal 205 informs the user 203 of the recommended sites and the incentives (S205). For example, the user terminal 205 displays the recommended sites and the incentives on a display unit of the user terminal 205.

The control apparatus 201 may report the recommended sites and the incentives to the bicycle 202 or the docking station 204, and the bicycle 202 or the docking station 204 may inform the user 203 of the reported recommended sites and incentives. For example, the bicycle 202 or the docking station 204 has a display unit and displays the recommended sites and the incentives on the display unit.

Figure 21:
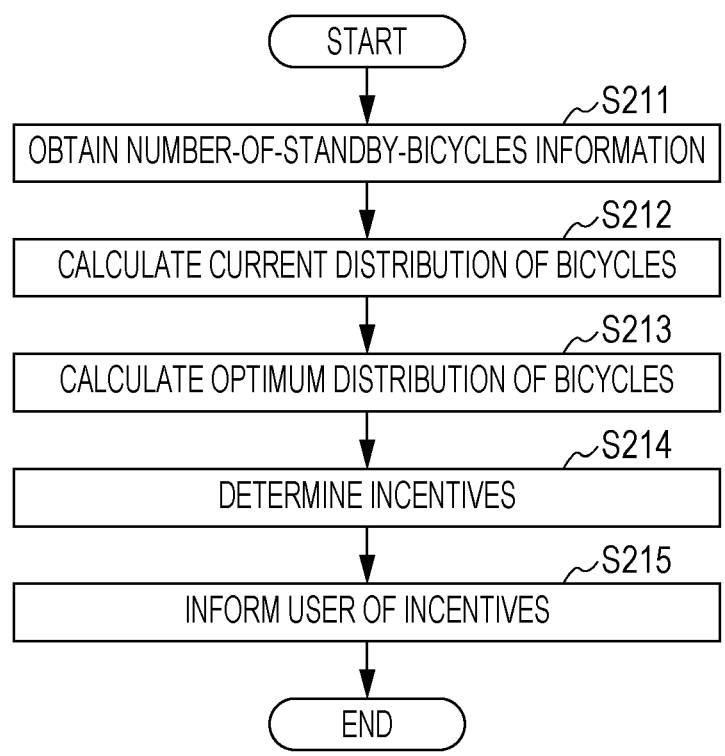
FIG. 21 is a flowchart illustrating processing performed by the control apparatus according to the second embodiment.

FIG. 21 is a flowchart illustrating the operation of the control apparatus 201. First, the vehicle information obtainer 218 obtains a plurality of pieces of number-of-standby-bicycles information from the docking stations 204 (S211).

Next, the standby-place manager 216 calculates the current distribution of the bicycles 202 by using the pieces of number-of-standby-bicycles information and updates the standby-place information 221 (S212).

FIG. 22 is a table illustrating one example of the standby-place information 221. As illustrated in FIG. 22, the standby-place information 221 includes, for each of the standby places, a standby-place ID that is information for identifying the standby place, location information (location (x, y)) indicating the location of the standby place, maximum-number-of-standby-bicycles information indicating the maximum number of bicycles 202 that can stand by at the standby place, and the number-of-standby-bicycles information indicating the number of bicycles 202 that are currently on standby at the standby place. Although the location information is indicated by two-dimensional coordinates, the location information may be indicated by three-dimensional coordinates or may be an address or the like. The standby-place manager 216 sequentially updates the number-of-standby-bicycles information. The standby-place information 221 may be map information like that illustrated in FIG. 8.

After S212, the demand predictor 217 calculates an optimum distribution of the bicycles 202 and stores the calculated distribution in the storage unit 213 as the bicycle-demand prediction information 222 (S213). The calculation of the bicycle-demand prediction information 222 may be performed in advance, or demand prediction information that is externally obtained may be used as the bicycle-demand prediction information 222.

For example, a distribution in which the bicycles 202 are evenly allocated on a map may be used as the optimum distribution. The demand predictor 217 may also calculate the bicycle-demand prediction information 222 by using a method that is analogous to the method for determining the demand prediction information 122 used in the first embodiment. Specifically, the bicycle-demand prediction information 222 indicates the number of necessary bicycles 202 at each standby place.

After S213, the incentive determiner 214 determines recommended sites and respective incentives by using the location information and the bicycle-demand prediction information 222 (S214). Specifically, the incentive determiner 214 determines, as recommended sites, standby places where the number of bicycles 202 on standby falls below a necessary number. When the number of standby places where the number of bicycles 202 on standby falls below the necessary number is larger than a predetermined number, the incentive determiner 214 may select the standby places corresponding to the predetermined number in descending order of the numbers of insufficient bicycles 202 relative to the necessary number or in increasing order of the ratios of the numbers of bicycles 202 on standby to the necessary number and may determine the selected predetermined number of standby places as recommended sites.

Also, the incentive determiner 214 may make the above-described determination on the standby places included in a predetermined range from the current location of the user 203 which is indicated by the location information.

After determining the recommended sites, the incentive determiner 214 determines incentives for the respective recommended sites. The "incentives" as used herein refer to, for example, points given to the user 203. For example, the user 203 can use the bicycle sharing system 200 by using the points, instead of cash. The method for using the points may be any method, and the points may be used, for example, for exchange with another service or other goods. Each incentive may also be a discount on a fee for the user 203 to use the bicycle sharing system 200 this time or in the future.

More specifically, the incentive determiner 214 increases the incentive as the distance from the current location of the user 203 (the bicycle 202) to the recommended site increases. The "distance" in this case may be a straight-line distance or a distance along a road. This makes it possible to determine each incentive corresponding to the amount of work of the user 203.

The incentive determiner 214 may also increase the incentive as the number of bicycles 202 at each recommended site decreases relative to the demand prediction for the recommended site which is indicated by the bicycle-demand prediction information 222. That is, the incentive determiner 214 increases the incentive as the number of insufficient bicycles 202 relative to the necessary number increases or as the ratio of the number of bicycles 202 on standby to the necessary number decreases. This makes it possible to eliminate a shortage of the bicycles 202.

The incentive determiner 214 may use the vehicle information 223 to predict the distribution of the bicycles 202 after a predetermined time elapses. FIG. 23 is a table illustrating one example of the vehicle information 223. As illustrated in FIG. 23, the vehicle information 223 indicates, for each bicycle 202, a vehicle ID for identifying the bicycle 202, the current location (location (x, y)) of the bicycle 202, the state of the bicycle 202, and the moving destination of the bicycle 202. The vehicle information obtainer 218 updates the vehicle information 223 on the basis of information obtained from the corresponding bicycle 202, the docking stations 204, or the user terminal 205.

The "state" in this case includes a state in which the bicycle 202 is on standby (available) at a standby place and a state in which the bicycle 202 is being used (in use) by the user 203. Also, for example, when a standby place in the vicinity of the moving destination of the bicycle 202 can be predicted, the vehicle information 223 indicates the moving destination. For example, when the user terminal 205 or the bicycle 202 has a navigation function, and a destination is set on the navigation function, the destination is set as a moving destination. Also, when the moving destination can be estimated using the moving direction or the trace of the bicycle 202, the vehicle information 223 indicates the estimated moving destination. This estimation may use a past movement history or the like.

The incentive determiner 214 uses information about the estimated moving destination to calculate the distribution of the bicycles 202 after a predetermined time elapses and uses the calculated distribution and the bicycle-demand prediction information 222 to determine the recommended site and the incentive.

The incentive determiner 214 may also use a past distribution to estimate the distribution of the bicycles 202 after the predetermined time elapses. For example, when the past distribution indicates that the number of bicycles 202 at a particular standby place tends to be small in a certain time segment, the incentive determiner 214 may correct the number of bicycles 202 at the particular standby place to a number smaller than the current number and then compare the corrected number with the bicycle-demand prediction information 222.

Also, since there is a possibility that the number of bicycles 202 increases at a recommended site that another user was informed of in an immediately previous period, the incentive determiner 214 may correct the number of bicycles 202 at the recommended site to a number larger than the current number and then compare the corrected number with the bicycle-demand prediction information 222. Alternatively, when a plurality of users is to be informed of a recommended site in a predetermined period, the informer 215 may inform the users of different recommended sites.

Figure 24:
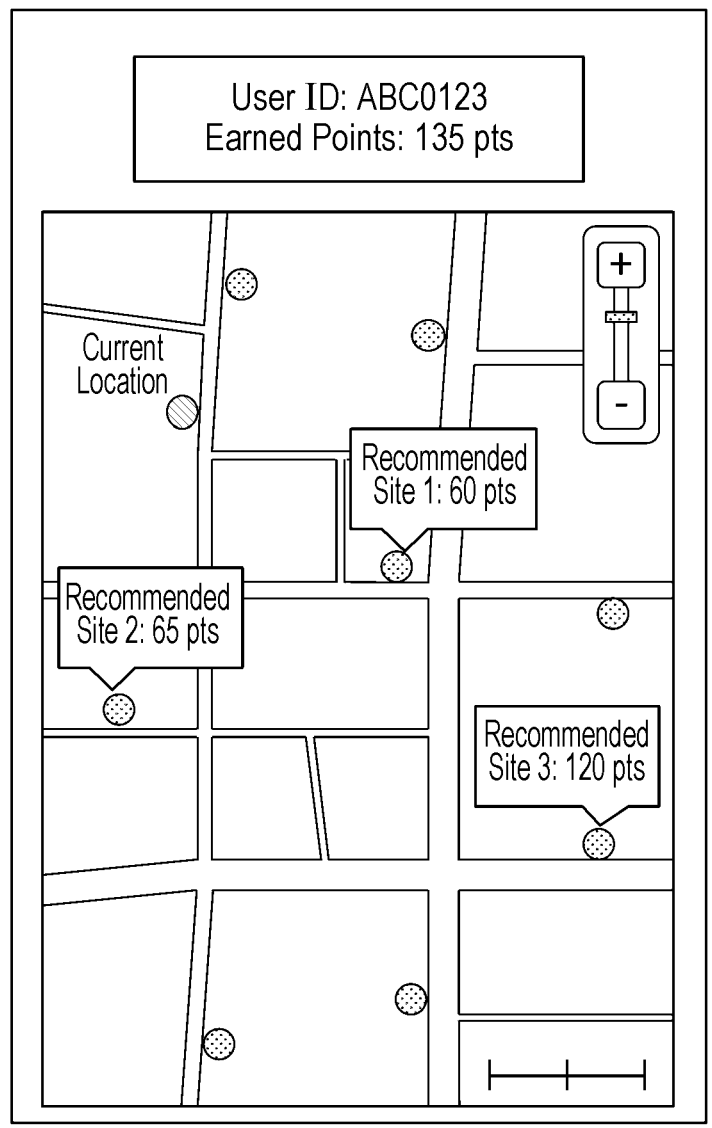
FIG. 24 illustrates an example of a display screen according to the second embodiment.

After S214, the informer 215 informs the user 203 of the determined recommended sites and incentives (S215). FIG. 24 illustrates an example of a screen displayed on the user terminal 205. This screen is displayed, for example, when the user 203 comes in a predetermined range from the bicycle 202 or the docking station 204 or the user 203 places the user terminal 205 over the bicycle 202 or the docking station 204 in order to start using the bicycle 202. The information on the screen may be displayed on a display unit provided on the bicycle 202 or the docking station 204 or may be displayed in accordance with an operation performed by the user 203 or the like or in accordance with another trigger.

For example, as illustrated in FIG. 24, recommended sites and the incentives (points) at the respective recommended sites are displayed on map information. In this case, placing a limit on the number of recommended sites that the user is informed of, as described above, makes it possible to suppress complicating information to be displayed.

Figure 25:
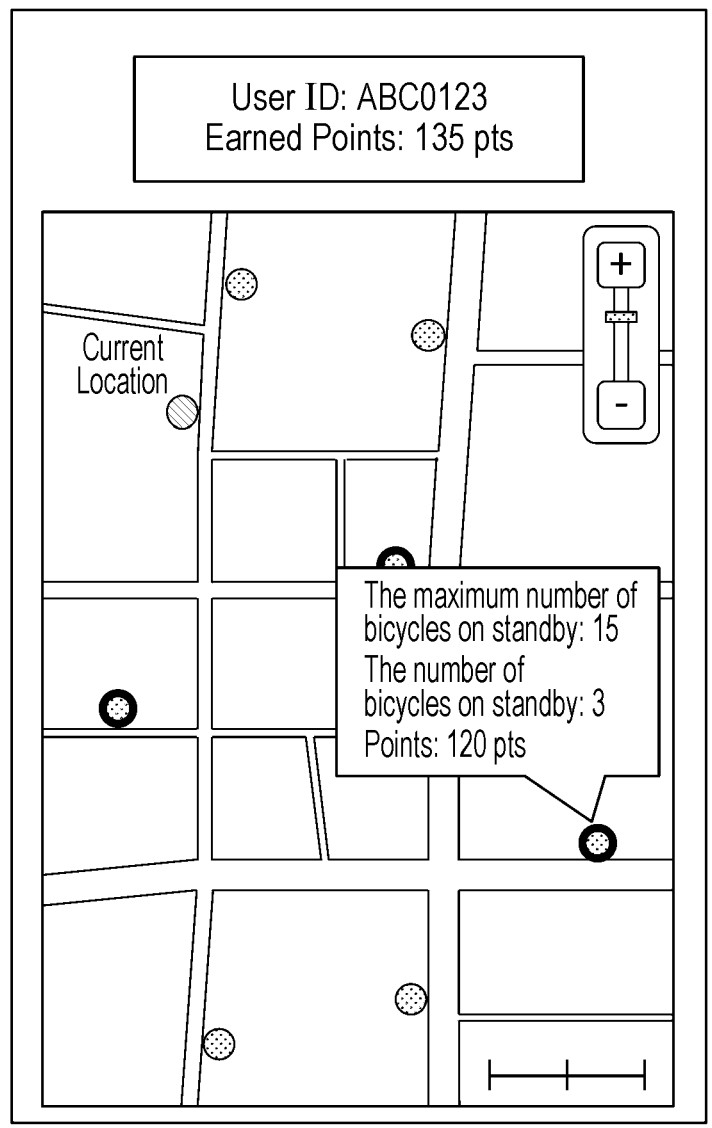
FIG. 25 illustrates an example of the display screen according to the second embodiment.

When recommended sites among a plurality of standby places are displayed in a highlighted manner, and the user taps one of the recommended sites, information about the tapped recommended site which includes an incentive may be displayed, as illustrated in FIG. 25.

Also, when the number of recommended sites is limited, as described above, a predetermined number of recommended sites may be selected from standby places included in the range of a map that is currently displayed. That is, when the range of a map that is displayed is scrolled, or the display magnification of the map is changed, the recommended sites to be displayed may be changed.

Also, when the user 203 moves to a recommended site with the bicycle 202 and returns the bicycle 202 at the recommended site, the corresponding incentive is given to the user 203.

As described above, the bicycle sharing system 200 determines an incentive to be given to the user 203 when the user 203 moves the bicycle 202 to a moving destination (a recommended site) that is one of the standby places, on the basis of the number of bicycles 202 that are on standby at each of the standby places and the demand prediction information 222 of the bicycles 202, and informs the user 203 of the moving destination (the recommended site) and the incentive.

This makes it possible to give guidance so that the user 203 moves the bicycle 202 to the recommended site. Thus, it is possible to reduce an imbalance in the distribution of the bicycles 202. For example, when two standby places exist near the destination of the user 203, and one of the standby places is set for a recommended site, the user 203 is more likely to select moving the bicycle 202 to the recommended site. Thus, it is possible to move the bicycle 202 to a standby place where the number of bicycles 202 is not sufficient, without increasing the amount of load on the user 203. Also, in sightseeing or the like, when a user is about to sequentially visit sightseeing areas, for example, there will also be a case in which the user first visits the sightseeing area set for a recommended site.

Although an example of a system in which the standby places (the docking stations 204) are pre-set has been described above, the scheme of the present embodiment is also applicable to a system in which no standby places are provided and the bicycles 202 are dropped off at arbitrary places. In such a system, for example, a lock attached to the bicycle 202 is opened or closed using the user terminal 205 or the like.

In this case, the control apparatus 201 manages the location of each bicycle 202 which is obtained using a GPS or the like provided on the bicycle 202. For example, the control apparatus 201 determines the locations of the bicycles 202 on standby on the basis of the vehicle information 223 illustrated in FIG. 23. On the basis of the locations of the bicycles 202 on standby, the control apparatus 201 calculates the current distribution of the plurality of bicycles 202. Also, for example, meshed zones obtained by dividing a map are used instead of the standby places. With a method that is analogous to that described above, the incentive determiner 214 determines incentives for recommended zones, which correspond to recommended sites, and incentives at the recommended zones by using the current number of bicycles 202 and the number of necessary bicycles 202 in each zone. The shape of the zones is not limited to a meshed shape and may be any shape. An object, such as a building or intersection, and surroundings thereof may be set as one zone. Even when drop-off like that described above is performed, standby places where drop-off can be performed, for example, places in the vicinity of roads, are predetermined. Hence, even in such a case, it can be said that recommended sites are determined among a plurality of standby places.

Although the above description has been given of the vehicle control apparatus 101 and the vehicle control system 100 according to the first embodiment and the bicycle sharing system 200 and the control apparatus 201 according to the second embodiment, the present disclosure is not limited to the embodiments.

The processing units included in the vehicle control apparatus 101, the control apparatus 201, or the like according to the above-described embodiment are typically realized as large-scale integration (LSI) circuits. The processing units may be individually realized by single chips or at least one or all of the processing units may be realized by a single chip.

Circuit integration is not limited to LSI and may be realized by a dedicated circuit or a general-purpose processor. The present disclosure may also utilize a field programmable gate array (FPGA) that can be programmed after manufacture of an LSI or a reconfigurable processor that allows reconfiguration of connections and settings of circuit cells inside an LSI.

In each embodiment described above, the constituent elements may be implemented by dedicated hardware or may be implemented by executing a software program suitable for the constituent elements. A program executor, such as a central processing unit (CPU) or a processor, may read and execute a software program recorded on/in a storage medium, such as a hard disk or a semiconductor memory, to thereby realize the constituent elements.

The present disclosure may also be realized as a vehicle control method that is executed by the vehicle control apparatus. The present disclosure may also be realized as a bicycle sharing method or a control method that is executed by the bicycle sharing system or the control apparatus.

The numbers used in the above description are all exemplary for specifically describing the present disclosure and are not limited to those exemplified above.

The division of the functional blocks in each block diagram is one example, and some of the functional blocks may be realized as one functional block, one of the functional blocks may be divided into a plurality of blocks, or one or more functions may be moved to another functional block. A single piece of hardware of software may process the functions of functional blocks having similar functions in parallel or in a time divided manner.

The order in which the individual steps illustrated in each flowchart are executed is exemplary and illustrative for specifically describing the present disclosure and may be an order other than the above-described order. Also, some of the above-described steps may be executed simultaneously (in parallel) with the other steps.

Although the vehicle control apparatus according to one or more aspects has been described above in accordance with the embodiment, the present disclosure is not limited to the embodiment. Modes obtained by applying various modifications conceived by those skilled in the art to the embodiments or modes constructed by combining the constituent elements in different embodiments may also be encompassed by the scope of one or more aspects of the present disclosure, as long as such modes do not depart from the spirit of the present disclosure.

The present disclosure is applicable to a vehicle control apparatus and is applicable to, for example, a transportation system using electric vehicles that can drive autonomous, a bicycle sharing system, or the like.

What is claimed is:

1. An apparatus comprising:
   a processor; and
   a memory storing a computer program, which when executed by the processor, causes the processor to perform operations including:
   determining whether or not a vehicle configured to travel autonomously is dropped off based on a state of the vehicle;
   determining, in response to determining that the vehicle is dropped off, a moving destination among a plurality of standby places, based on (i) a current location of the vehicle which is indicated by a global positioning system provided in the vehicle, (ii) locations of the plurality of standby places, and (iii) vehicle-demand prediction information indicating vehicle-demand prediction distribution; and
   instructing the vehicle to move to the determined moving destination,
   wherein the determining whether or not the vehicle is dropped off determines whether or not the vehicle that transfers a user to a predetermined location is left at the predetermined location without the user in the vehicle at the predetermined location, and
   the moving destination is determined in response to determining that the vehicle is left at the predetermined location without the user in the vehicle.

2. The apparatus according to claim 1,
   wherein, in the determining of the moving destination, moving-destination candidates included in a predetermined range from the current location are determined among the plurality of standby places, and the moving destination is determined among the moving-destination candidates based on the vehicle-demand prediction information.

3. The apparatus according to claim 1,
   wherein the vehicle is an electrically powered vehicle;
   battery chargers for the vehicle is provided at the plurality of standby places; and
   in the determining of the moving destination, when the vehicle is dropped off, the moving destination is determined based on (i) the current location, (ii) the locations of the plurality of standby places, (iii) the vehicle-demand prediction information, and (iv) a current battery charge of the vehicle.

4. The apparatus according to claim 3,
   wherein, in the determining of the moving destination, moving-destination candidates included in a range that the vehicle is capable of traveling from the current location by using the current battery charge are determined among the plurality of standby places, and the moving destination is determined among the moving-destination candidates based on the vehicle-demand prediction information.

5. The apparatus according to claim 1,
   wherein, in the determining of the moving destination, when the vehicle is dropped off, the moving destination is determined based on (i) the current location, (ii) the locations of the plurality of standby places, (iii) the vehicle-demand prediction information, and (iv) locations of a plurality of other vehicles.

6. The apparatus according to claim 1,
   wherein the operations further include:
   determining the vehicle-demand prediction information based on population information.

7. The apparatus according to claim 1,
   wherein the operations further include:
   determining, as the vehicle-demand prediction information, dynamic demand prediction information based on dynamic power consumption data.

8. The apparatus according to claim 1,
   wherein the operations further include:
   determining, as the vehicle-demand prediction information, dynamic demand prediction information based on dynamic sales data of stores.

9. The apparatus according to claim 1,
   wherein the operations further include:
   determining, as the vehicle-demand prediction information, dynamic demand prediction information based on weather forecast information.

10. The apparatus according to claim 1,
    wherein, in the determining of whether or not the vehicle is dropped off, the state of the vehicle includes at least one of (i) a speed of the vehicle, (ii) a change in weight applied to the vehicle, (iii) opening and closing of a door, and (iv) locking of a door.

11. A method performed by a processor, the method comprising:
    determining whether or not a vehicle configured to travel autonomously is dropped off based on a state of the vehicle;
    determining, in response to determining that the vehicle is dropped off, a moving destination among a plurality of standby places, based on (i) a current location of the vehicle which is indicated by a global positioning system provided in the vehicle, (ii) locations of the plurality of standby places, and (iii) vehicle-demand prediction information indicating vehicle-demand prediction distribution; and instructing the vehicle to move to the determined moving destination, wherein the determining whether or not the vehicle is dropped off determines whether or not the vehicle that transfers a user to a predetermined location is left at the predetermined location without the user in the vehicle at the predetermined location, and the moving destination is determined in response to determining that the vehicle is left at the predetermined location without the user in the vehicle.

12. The method according to claim 11, wherein the determination of the moving destination includes:

determining a range which is a circle, a center of the circle being the current position of the vehicle which is determined using the global positioning system, a radius of the circle being a maximum distance which the vehicle can move using a current battery charge, updating availability information which indicates each of the plurality of standby places is available or not, determining whether or not one of the plurality of standby places which is available is included in the range using the availability information, when the one of the plurality of standby places which is available is not included in the range, updating the availability information after a predetermined time elapsed, determining not to move the vehicle until the one of the plurality of standby places which is available is included in the range, when the one of the plurality of standby places which is available is included in the range, determining the moving destination from the plurality of standby places using the vehicle-demand prediction information, the vehicle-demand prediction information indicating that demand of the moving destination is high when a number of user who started to ride on the vehicle at the moving destination in a past is larger than the number of user who started to ride on the vehicle at other places in the past.

* * * * *